United States Patent [19]
Shuen

[11] Patent Number: 5,572,528
[45] Date of Patent: Nov. 5, 1996

[54] MOBILE NETWORKING METHOD AND APPARATUS

[75] Inventor: Pauline Shuen, Palo Alto, Calif.

[73] Assignee: Novell, Inc., Provo, Utah

[21] Appl. No.: 408,230

[22] Filed: Mar. 20, 1995

[51] Int. Cl.$^6$ .................................................. H04L 12/46
[52] U.S. Cl. .................................... 370/85.13; 370/94.3
[58] Field of Search ........................ 370/54, 58.1, 58.2,
370/58.3, 60, 60.1, 61, 79, 85.6, 85.13,
85.14, 94.1, 94.2, 94.3, 95.1; 395/200,
325, 500, 725, 800; 340/825.5, 825.51

[56] References Cited

U.S. PATENT DOCUMENTS

| 5,086,426 | 2/1992 | Tsukakoshi et al. | 370/85.13 |
| 5,136,580 | 8/1992 | Videlock et al. | 370/60 |
| 5,179,555 | 1/1993 | Videlock et al. | 370/85.13 |
| 5,317,568 | 5/1994 | Bixby et al. | 370/85.6 |
| 5,426,637 | 6/1995 | Derby et al. | 370/85.13 |
| 5,446,736 | 8/1995 | Gleeson et al. | 370/85.13 |

OTHER PUBLICATIONS

"IPX Reference"0 Novell, Inc., San Jose, CA, 15 Apr. 1994.
Perkins, C., editor. "IP Mobility Support" Internet Engineering Task Force, 27 May 1995.

Primary Examiner—Alpus H. Hsu
Attorney, Agent, or Firm—A. John Pate; Berne S. Broadbent; Gary D. E. Pierce

[57] ABSTRACT

An internetwork including a plurality of local area networks may include wireless and hard-wired local area networks. The internetwork may also include wide area network links between routers. The system includes routers between networks, which may be bridged networks. Certain routers are configured as home routers. Home routers bind two addresses for each mobile node on a given network when that node logs-in with a home router. Mobile nodes log-in with a home router that assigns a virtual address that does not change throughout a session. Each time, a mobile node roams to another network across a router boundary, the virtual address remains the same and all packets directed to the mobile node are received by the home router which advertises that it can reach the mobile node. As the mobile node roams, it reports back to the home router a local address to which the home router forwards all packets directed originally by correspondent nodes to the virtual address. Mobile nodes may log-in to a router many hops removed from a local area network of the situs. Mobile nodes may also roam across wide area links. The system is transparent to a user.

24 Claims, 13 Drawing Sheets

MOBILE NETWORKING METHOD AND APPARATUS

BACKGROUND

1. Field of the Invention

This invention relates to computer networks and, more particularly, to novel systems and methods for connecting a computer as a node on a network.

2. The Background Art

Computer networks are actually many networks, or are defined at several levels of grouping and communication. The terms primary (e.g. LAN), secondary (e.g. routed) and tertiary (internetworked) network indicate the extent and complexity of a "network". A primary network may be thought of as the most fundamental connecting together of two nodes (e.g. computers, workstations, devices) in some manner. A secondary network is one including at least two primary networks connected by a router. A tertiary network is one including at least first and second primary networks separated from each other by a third (intervening) primary network. The third intervening primary network is connected to the first primary network by one router, and to the second primary network by another router. A secondary network, and especially a tertiary network, may also be referred to as internetworks.

Low level networking typically involves several devices exchanging data with one another. Transmission may be facilitated by a communication link, for example a hard wire, fiber-optic cable, radio frequency transmitter/receiver, or other physical communication mechanism, connecting a series of network cards. Network cards provide a mechanical and data connection between the communication link (e.g. fiber-optic, wire, or wireless) and any device to be connected to the network. A device may typically contain a processor, such as a computer or peripheral equipment. The processor may be programmed with communication software (programming instructions) for communicating data between the device and the network communication link. Each such device (computer or peripheral) is a node on the network. Some networks have a server.

A server is a computer connected to a network via a network card and is programmed to act as a traffic manager and storage device for data being transmitted over the network by the various connected nodes. A hard wire interconnected to a group of network cards with attached computers, with one of those computers acting as a server, is a typical network. In other networks, every device is a server.

A primary network is the network with which a node communicates most directly. A primary network is the most fundamental system that can be called a network. A secondary network is a network connected in some way to a node, but exchanging data with a node through a router. A router is a computer connected to at least two primary networks.

By secondary network is meant routed networks comprised of primary networks interconnected by a router. Because a router is a computer connected to at least two networks, it may be programmed to manage the communication of data between nodes on different primary networks. Two nodes, each connected to a different primary network, with those two different primary networks directly communicating through (e.g. sharing, typically directly connected through) a single router constitute a secondary network.

A tertiary network is one in which data may be exchanged between two nodes on different primary networks, which primary networks do not share a router. When a primary network is connected to more than one router, and each such router is connected to more than one primary network, a tertiary network exists. Since tertiary networks may extend from one primary network to another through several intervening primary networks and routers, the routers must be programmed to receive and forward messages from nodes that are foreign to any given router. Foreign may be thought of as describing any device or data pertaining to a primary network that is not connected to a router shared with the subject network. Thus, as the name network implies, a tertiary network can extend indefinitely from router to router to router via intervening primary networks. (Theoretically virtually forever, within the constraints of the laws of electrophysics.)

A wireless communication system may not require any hard wire connection. In general, a link between a node and a primary network may be wireless. Each node may contain a network card for sending and receiving data by wireless transmission with respect to another device. Thus an entire primary network may be wireless. Also, a network between two routers forming a wide area network (WAN), may be wireless. Alternatively, a network using a hard wire may have access points. An access point bridges between a hard wire associated with a primary network and a node communicating by a wireless communication link with that primary network. An access point includes a wireless transmitter and receiver for communicating with a wireless network card in a node, as well as a connector communicating with the hard wire of the network. Thus, all access point may be thought of as a transmitter and receiver for communicating data between a network and a node not hard wired into that network.

As computer network technology has grown to encompass tertiary networks, network level addressing has become more than a locally administered task. By address is not meant MAC layer address in an ISO/OSI data-link layer. That addressing is resolved by an access point as a user roams. The need is for unambiguous ISO/OSI network layer addressing during roaming and dynamic address changing.

A data package (message, packet, stream) needs to be communicated to a destination address. A source address is needed for a response to be returned. An address may be thought of as a one or more numbers, digits, characters, words, bytes, combination thereof, or the like included in a data transmission, identifying a sender or receiver.

As internetworks, (tertiary networks) become very large, a scheme is needed for easily addressing all the interconnected nodes interconnected at a network ISO/OSI level. (International Organization for Standardization Open Systems Interconnection model.) Remote (foreign, more than one hop distant) nodes are not controllable by a network. A single message to or from a foreign node must be transmissible and receivable without confusion.

For example, when a single computer connects to several peripheral devices, the computer may assign, or a user may assign, all address to each peripheral device. When several nodes (devices, computers, etc.) are connected in a network, software in a network server may control, assign, or coordinate addresses. For example, a network manager (user) may program the server on a primary network to recognize a unique number for each node connected to the network. Thus a server could receive and deliver data with respect to each node. Two routers could likewise be programmed to communicate and coordinate addresses. However, as soon as three routers are involved, foreign nodes become intractable to address without a global addressing scheme. Moreover, routers may connect without practical limitation as to numbers of primary networks to which each may connect.

To address this problem organizations exist for administering global addresses to devices that a user desires to connect to a network. Thus, schemes exist for a user to acquire a global address by which a device may be known, regardless of network connection. For example, users on a network or service receive an assigned address. Also, every network-connectable device connects to a network card, often within the envelope of the device. Each network card has assigned by the Institute for Electrical and Electronic Engineers (IEEE standard 802) identification. The identification is unique to that card at the Media Access Control, or MAC, sublayer of the ISO/OSI data-link level.

Any primary network communicates data corresponding to addresses of nodes connected to that network. Similarly, a router may communicate data associating the router with addresses of nodes connected to primary networks accessed through that router.

Unfortunately, a user logging on to a network must configure a node. Configuration may be thought of as programming a node for setting up connections and protocols. A node may need to identify other devices to be addressed, or to identify itself to a router assigning the address of the node. Thus, once configured, a node may send and receive messages. However, logging onto a network and configuring a node's system typically takes substantial time. Moreover, knowledge of certain commands, codes and the like is typically required of a user. Also, whenever a node is not going to be available any longer, a user must log off the network so that the network does not treat the absence of a node as an error.

No primary network extends indefinitely. Some limitations may arise due to security, media change, traffic load, addressing, or physical limits. For example, radio signals are shielded by metal preventing transmission. Obstructions limit an infrared line of sight. Thus, a wireless network is typically limited to a single floor of a building, and to a specific range of distance. Even hard-wired networks are constrained by limitations of power, integrity of signal transmission, and interference, associated with distances traversed by a primary network.

Because no primary network can extend indefinitely, and because of the administrative difficulties on system administrators of network servers and on individual users having to log on and off to move about between primary networks, roaming is desirable. Roaming may be thought of as communication by a node (e.g. computer, processor, peripheral device) at more than one connection point on an internetwork. That is, a roaming device may be a computer carried by an individual walking over a factory floor serviced by several wireless LANs.

Roaming may include disconnecting a node from a first primary network followed by connecting the node to a second primary network without intermediate logging off and on. Several examples of roaming situations are instructive. For example, on a factory floor, personnel may move from location to location logging data associated with manufacturing or shipping operations. With the advent of stylus based input devices, many operations formerly done by hand, such as recording counts while inventorying stock, for example, are now done with an input pad and stylus. Similarly, a host of tasks once done by hand, and involving a person who moves from location to location throughout a day, are now computerized but must still be accommodated by roaming.

Roaming is impossible in some networks. That is, a system manager must configure a network server to recognize a new node. Meanwhile, in such networks a configuration of more than one primary network to simultaneously accept a node's global address may not be possible. Thus, the node cannot be moved from one primary network to another at the will of an individual user.

Even in networks that permit roaming, addressing may present a major difficulty for secondary and tertiary networks. For example, in the addressing and routing process to reach a mobile node, three routers may typically be required to be loaded with different specialized software that must be available and upgraded in any network to which a mobile node roams in an internetwork. Networks today do not allow a node to roam to a network in an internetwork that does not have specialized software hosted on specialized processors forwarding messages, and specialized processors for logging on. That is, mobile devices may not generally log on to a network remote from their "home" network, unless the remote network includes processors programmed specifically for forwarding messages, and processors programmed specifically for logging the mobile devices on to the network. The requirements for the existence and upkeep of such systems inhibits roaming.

What is needed is a plug-and-play system. A system is needed in which all of the addressing of a node is transparent to a user. Moreover, a system is needed that requires less of a remote network, such as fewer specially-programmed processors (routers, foreign agents, etc.) during roaming, as well as fewer upgrades of software by a system manager.

Disruption by a node may be a serious problem in network software hosted on nodes. A server may "hangup" on a node when the node has dropped out. That is, for example, a server periodically queries a node to determine whether or not the node is still connected to that network. Thus, if a proper response is not received, the server closes the "session" or data connection with the missing node, but may instead wait indefinitely for an event that never comes. One example is an application that is waiting for a response over a network, and has control over a node temporarily, that is not relinquished when the response never arrives.

An application is a computer program including one or more instructions. An application operates in the highest OSI layer. An application is also sometimes referred to as a computer program. When an application is running on a node, or when a network session is running, an application may be relying on the network connection to pass data.

When an application requires data through the network connection and the data is not forthcoming because the connection between the network and node has been disrupted, the application may "crash," or instead "hang" the node. Hanging means that a device has ceased to respond to data. That is, a processor may cease to respond to instructions, commands, inquiries and the like because some instruction is awaited by the processor, and the instruction is not forthcoming.

Hanging is different from crashing in that an application or system (operating system) may crash by ceasing all operation. Crashing usually results in the computer requiring a re-boot. Hanging may require a re-boot, but is usually characterized by the output device (e.g. monitor or display) remaining as it is without providing any further output nor prompts, and not responding to any inputs.

Another problem for mobile nodes on an interact work is system watchdogs. System watchdogs are programs resident in a server for monitoring the status of connections between the network and nodes. When a connection is disrupted the watchdogs initiate disconnection of the offending node by the server.

If a file is open and the connection is broken, the connection must come back before the node tries to read data from the server. If the connection does not come back in time, the node or application on the node may crash regardless of whether or not the router's connection can be re-established. Thus the node is crashed and the fact that the connection is remade does not bring the node back.

Node disruptions and dropouts are most often caused by events that may happen during the life of a connection (e.g. session). Generally, these events are related to activity that interrupts the continuity of a network node address, the continuity of a physical network connection, or the continuity or quality of a network session.

One need is that of dynamically resolving the changing of addresses in a network. Some causes of dynamic changing of addresses are roaming and "hot swapping" of a network interface card in a node without logging off or shutting down either the node or the hosted applications.

By hot swapping is meant the removal and replacement of a network card in the network slot of a computer without shutting down, logging off a network, or closing applications. For example, a user may withdraw a network card and replace that card later with the same or a different network card. Thus, a computer may be disconnected from a network simply by withdrawing the computer from the network card associated with the network. Similarly, a network card may be hot swapped with respect to the network carrier, such as a line, wireless connection, fiber-optic cable, twisted pair, coaxial cable, or the like that carries the electronic signal between a node and a network server or other devices on the network.

Another need is graceful recovery or adaptation to different or reduced performance by a network (e.g. by a node, router, or server), in lieu of crashing or hanging. For example, suspension and recovery from a disrupted connection resulting from sleeping, moving out of range of a wireless access point, breaking a wired connection, and or a time lag during a hot swap of network cards such as PCMCIA cards.

Another need is storing and binding two or more actual addresses, as well as a virtual address, each to be selectively useable for a single client node on a single network or an internetwork. A device may not be addressed at more than one real address at a time, although a router may present different addresses for itself to different networks. However, a need exists to selectively and dynamically switch between network interface cards in a node having multiple slots for such cards. For example, enablement of automatic switching between a default and a backup card when a default card drops out is very desireable.

A user-transparent, mobile interface for networks and internetworks is needed that permits roaming without requiring a new home router to exist at a new remote network for logging-on. Also new remote network after roaming. Moreover, a system is needed that does not require pre-existing specialized equipment at a remote location to which a node may roam on an internetwork. Rather, what is needed is a system that permits a mobile node to access the logging on and roaming features from any remote network operating under a standard network protocol (such as IPX), so long as the remote network is part of an internetwork containing a router configured for providing a constant virtual address and binding it to an actual address for the mobile node. Otherwise, mobility is impaired when a location does not have the right type of hardware or software locally resident. Moreover, software upgrading and version control become serious burdens at all the remote locations. A system that permits logging on to a home router virtually any number of hops away on an internetwork, and roaming likewise with a minimum of software and hardware is needed.

BRIEF SUMMARY AND OBJECTS OF THE INVENTION

In view of the foregoing, it is a primary object of the present invention to provide a system for providing continuous, transparent communication between a mobile node and a primary network, a mobile node and a secondary network, a mobile node and a tertiary network, and a mobile node and another node on a primary, secondary, or tertiary network.

It is an object of the invention to resolve dynamic changing of network addresses in a network, secondary network, and tertiary or internetwork.

It is an object of the invention to provide dynamic changes of addresses, for example, due to roaming or hot swapping of a network interface card in a node, without logging-off or shutting-down either the node or the hosted applications running on the node.

It is an object of the invention to enable dynamic switching between multiple network cards having respective default and backup addresses corresponding to a single node on a network, without hanging any device on the network and without crashing any device on the network.

It is an object of the invention to provide for suspension and recovery from a disrupted connection between a node and a network.

It is an object of the invention to provide for storage and access of two addresses simultaneously for a single node on a network, and for a single node in an internetwork.

It is an object of the invention to provide a virtual address that remains constant during a session, which session will not be interrupted, for example, by roaming, disconnection, or suspension of a node from a network or internetwork, and an actual or local address corresponding to a physical location of a node on a network in an internetwork.

It is an object of the invention to provide simultaneous storage for two or more addresses each corresponding to a different network cards or other interface card physically connected to a single node on a network.

It is an object of the invention to provide simultaneous loading of, and dynamic switching between, multiple network interface cards in a computer for accessing a network.

It is an object of the invention to provide a system for supporting the dynamic switching from one card to another card by a node, in which one card fails to maintain a network connection, in a manner that provides a backup connection of services through the second card.

It is an object of the invention to provide for redundant network interfaces for a node roaming across network boundaries.

It is an object of the invention to support a user-transparent, mobile node for roaming between networks in all internetwork without requiring a new home router at a new location, or a new log-on to the remote network at the new location.

It is an object of the invention to enable the user transparent, mobile network connection of applications running on a mobile node when that mobile node roams out of range of a wireless connection to a network or physically disconnects from a hard-wired connection to a network, and later re-establishes physical or data-link connections to the same or a new network.

It is an object of the invention to provide a mobile node and network in which the mobile node may roam between a selection of wireless and hard-wired connections on an internetwork connected to the network, and where the node can log-on and can maintain session continuity throughout the internetwork, even if a home router, foreign agent, or other device similarly configured is not present on a remote network to which the node attempts to connect.

It is a further object of the invention to provide a mobile network interface that may operate at any location selected by a user including a remote network removed from the network normally accessed by a user.

It is another object of the invention to provide for connection of a mobile node while requiring a reduced amount of software, and upgrading of such software, for supporting devices, such as routers, for example, in an internetwork.

It is an object of the invention to provide a network supporting a device roaming across primary networks connected in a tertiary network.

It is an object of the invention to automatically configure a network to address roaming nodes according to a method transparent to a user, without requiring intervention by a user in creating or identifying network addresses of a node in a primary, secondary or tertiary network.

It is an object of the invention to provide a system for user-transparent roaming between wireless networks, between hard-wired and wireless networks, and vice versa, and for supporting hot swapping of network cards from wireless to wire and back within a single node, without disconnecting a session.

It is an object of the invention to control data communication and addressing for a node on a primary network connected to any one of a plurality of primary networks and a home router, and automation of roaming network addressing transparently to the user.

It is an object of the invention to spoof network "watchdogs" by configuring a home router responsive to the queries of network watchdogs.

Consistent with the foregoing objects, and in accordance with the invention as embodied and broadly described herein, a method and apparatus are disclosed in one embodiment of the present invention as including a mobile host operably connectable to a network, the network being operably connected to a home router for assigning a constant address to the mobile host, and for storing the constant address, a changeable local address assigned by the mobile host, and binding data relating the constant address to the local address. The constant address is an ISO/OSI network level address corresponding to a virtual network and virtual node number created by the home router and uniquely identifying the mobile host throughout a session. The local address is an ISO/OSI network level address corresponding to a network on a router, which need not be the home router, and a unique geographical location (connection point) on the network, (to which a mobile mode might be connected only temporarily, to later be connected to another network). The local address also uniquely identifies the mobile host to the home router during the time that the mobile host is linked to the connection point of the network.

An apparatus made in accordance with one embodiment of the invention may include an internetwork including a plurality of networks interconnected by a plurality of routers. The apparatus also may include wired networks and wireless networks each network containing one or more nodes or hosts connected thereto for communicating data over the internetwork.

The apparatus may include a home router programmed to store multiple, ISO/OSI network level addresses (addresses) for nodes connected to a network. The home router may also be programmed to create for a node on a network a constant address, assign the address to the node, receive from the node a local address created by the node, bind the constant address and the local address, and store both the constant and local addresses.

The node may be programmed to be a mobile node. The mobile node may roam across multiple routers and networks, and may access the home router whenever a connection is made with another network, forwarding to the home router a new local address at each new network. The home router may be programmed to forward to the current or present local address, corresponding to the mobile node, all packets addressed to the virtual or constant address corresponding to the mobile node.

The home router may be programmed to change headers on packets addressed to the mobile node to properly direct all packets addressed to the constant address, and all packets addressed to and from the present local address corresponding to the mobile node.

Multiple home routers may be programmed to be accessible (to transmit and receive data) from mobile nodes connected to networks not containing a home router. A home router may be programmed to log a mobile node on without regard to the number of hops between the mobile node and the home router. A home router may be programmed to access the mobile node and store addresses regardless of the number of hops between the home router and the mobile node.

The mobile node may be programmed to permit a user to change the network card in the mobile node without shutting off power to the processor, without logging off the internetwork, and without closing the applications running on the mobile node. The mobile node may also include slots for multiple network cards, and may include slots for being connected to the internetwork with two network cards simultaneously. The mobile node may be programmed to transfer data via a preferred card of the multiple network cards. The mobile node may provide for transfer of data via a less preferred card of the multiple network cards upon a failure of the preferred card to maintain a data-link or other necessary connection to the internetwork. The home router may be programmed to store two or more local addresses corresponding to two or more network cards, in addition to a virtual address, all of which addresses uniquely correspond to the mobile node.

A method practiced in accordance with an embodiment of the invention may include advertising on an internetwork by a mobile mode comprising a processor. The method may include a response by a home router, and logging on to the home router by the mobile node. The mobile node may obtain from a network card associated with the mobile node, an ISO/OSI MAC layer address.

The mobile node may obtain from the home router or from a network server a network number identifying a network to which the mobile node is communicably connected by the network card. The mobile node may define a local address. The local address may include data corresponding to the MAC layer address of the network card and the network number. Because a MAC sub-layer address for each network card is unique, the mobile host may create multiple local addresses over multiple connection points, including hard-wired and wireless access points.

A user may connect a mobile node to multiple network cards, and may connect more than one of the multiple network cards to a network to be connected simultaneously. The home router may receive from the mobile node one or more local addresses, corresponding to the one or more network cards.

The home router may create a virtual network and a virtual node number. The home router may assign to the mobile node a virtual address. The virtual address may contain data corresponding to the virtual network number and the virtual node number.

The home router may bind the virtual address to one or more local addresses corresponding to the mobile node. The home router may advertise over the internetwork that the mobile node may be reached through the home router. The home router may advertise the address of the mobile node as the virtual address.

The home router may assign a priority or preference to each card, which may be identified during use with a unique local address associated with the mobile node. When multiple addresses are simultaneously associated with the mobile node, the home router may exchange data over a highest priority network card providing au available connection to the internetwork or the home router. The home router or the mobile node may select from a plurality of local addresses, associated with a mobile node, a local address providing the highest bandwidth connection for exchanging data with the mobile node.

The home router may change the header in a packet addressed to the mobile node. The home router may change the destination address of a packet from the virtual address to a local address associated with all actual connection of the mobile node to the internetwork.

The mobile node may disconnect at a data-link layer or a physical layer from a first network and move to a second network, establishing one or more connections to the second network, without ever logging off of the home router. The home router may bind one or more new local addresses to the virtual address corresponding to the mobile node, in lieu of old local addresses corresponding to the first network.

The home router and mobile node may continue comparable types and numbers of connections and data exchanges through the second network as through the first network, without intervention or awareness by a user. The mobile node may execute all activities through the second network that could be executed through the first network.

The home router may forward to a new local address all packets addressed to the virtual address corresponding to the mobile node. The home router may change headers in all packets directed to and from the virtual address corresponding to the mobile node in order to provide for intended delivery at an appropriate node or mobile node.

The home router may be accessible to a mobile node from a network removed from the home router by one, two, three, up to an indefinite number of hops away, limited only by numerical limits of hardware, and a user's preferences, or protocol limits of network health. The home router may be available for supporting roaming during a session and initial logging on by a mobile node connected to a network removed by one, two, three, or an indefinite number of hops away from the home router.

Networks, systems, hardware and software are often described in terms of layers or levels. The layer or level concept was developed by the International Organization for Standardization Open Systems Interconnection model (ISO/OSI). The ISO/OSI model may be thought of as a layered architecture or plan that standardizes levels of service and types of interaction for computers exchanging information through a communications network. The ISO/OSI model separates computer-to-computer communications into seven layers, or levels, each building upon the standards contained in the levels below it. The lowest of the seven layers deals solely with hardware links. The highest deals with software interaction the application/program level. The seven levels are application (highest level), presentation, session, transport, network, data-link, and physical level.

The network level or layer is responsible for delivery of packets of data when two nodes are located in different primary networks. A principal function of the network layer is to ensure that information arrives at the computer, device, node, that was intended or addressed. Since information may be transmitted indirectly from a sender to a receiver, the data comprising the information may be routed from one network or circuit to another. In fact, information may be cut up into packets smaller than the entire message with each packet being routed over a different network or line to arrive at the same eventual destination. The network layer establishes and maintains a path for information to be transmitted over. Another function of the network layer is the recombination of the fragmented messages. Thus, because of the protocols and operation of the network layer, the actual route that any information takes to arrive at a destination is not material to any other operation in any other layer.

The data-link layer or level is responsible for delivery of packets of data between nodes in a primary network. The physical layer is the first or lowest of the seven layer ISO/OSI model. The physical layer is related to hardware. The physical layer deals with all aspects of connection and maintenance of physical links between communicating devices.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 16, is not intended to limit the scope of the invention, as claimed, but it is merely representative of the presently preferred embodiments of the invention.

Figure 1:
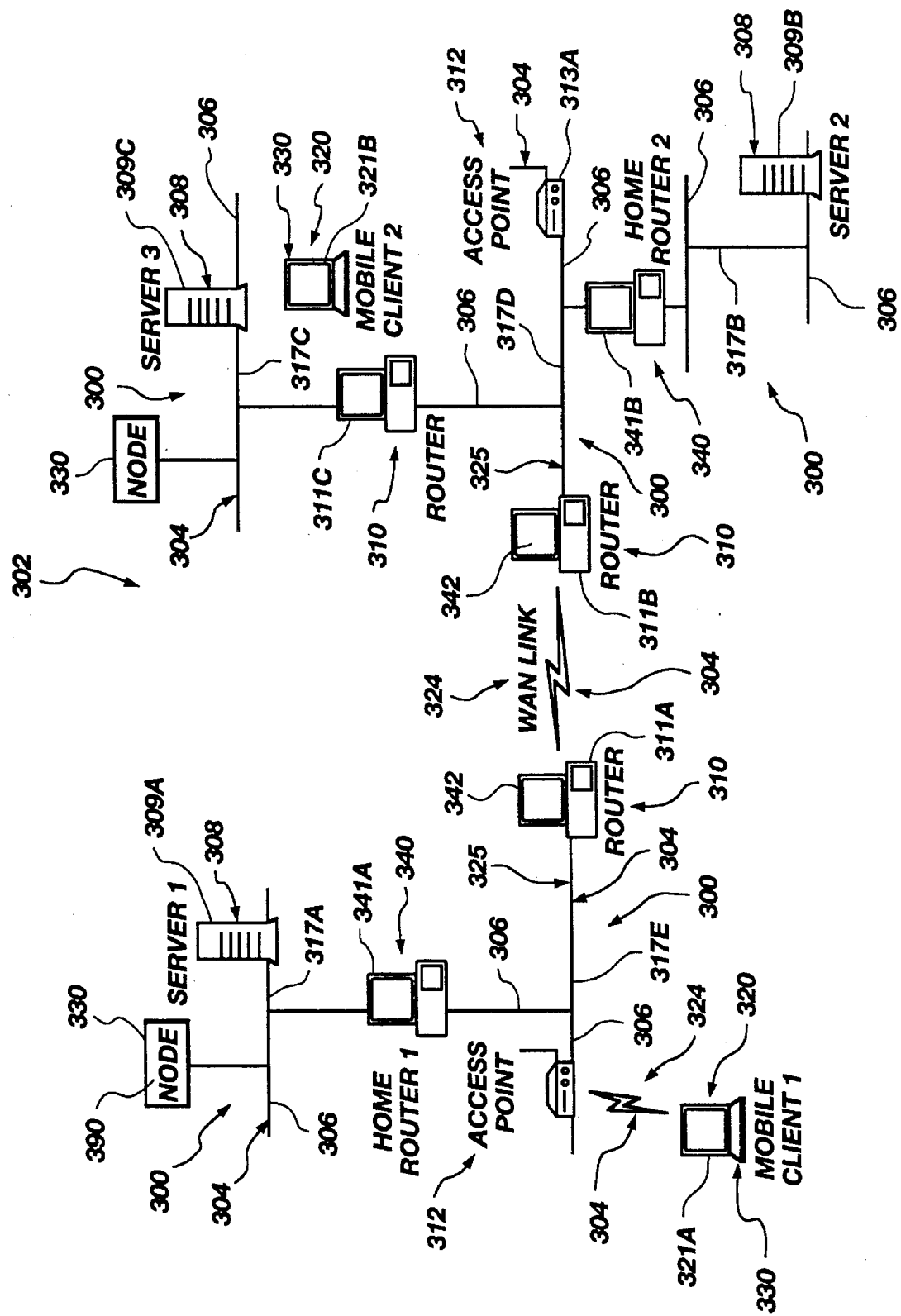
FIG. 1 is a schematic diagram of an internetwork in accordance with the invention.
Figure 2:
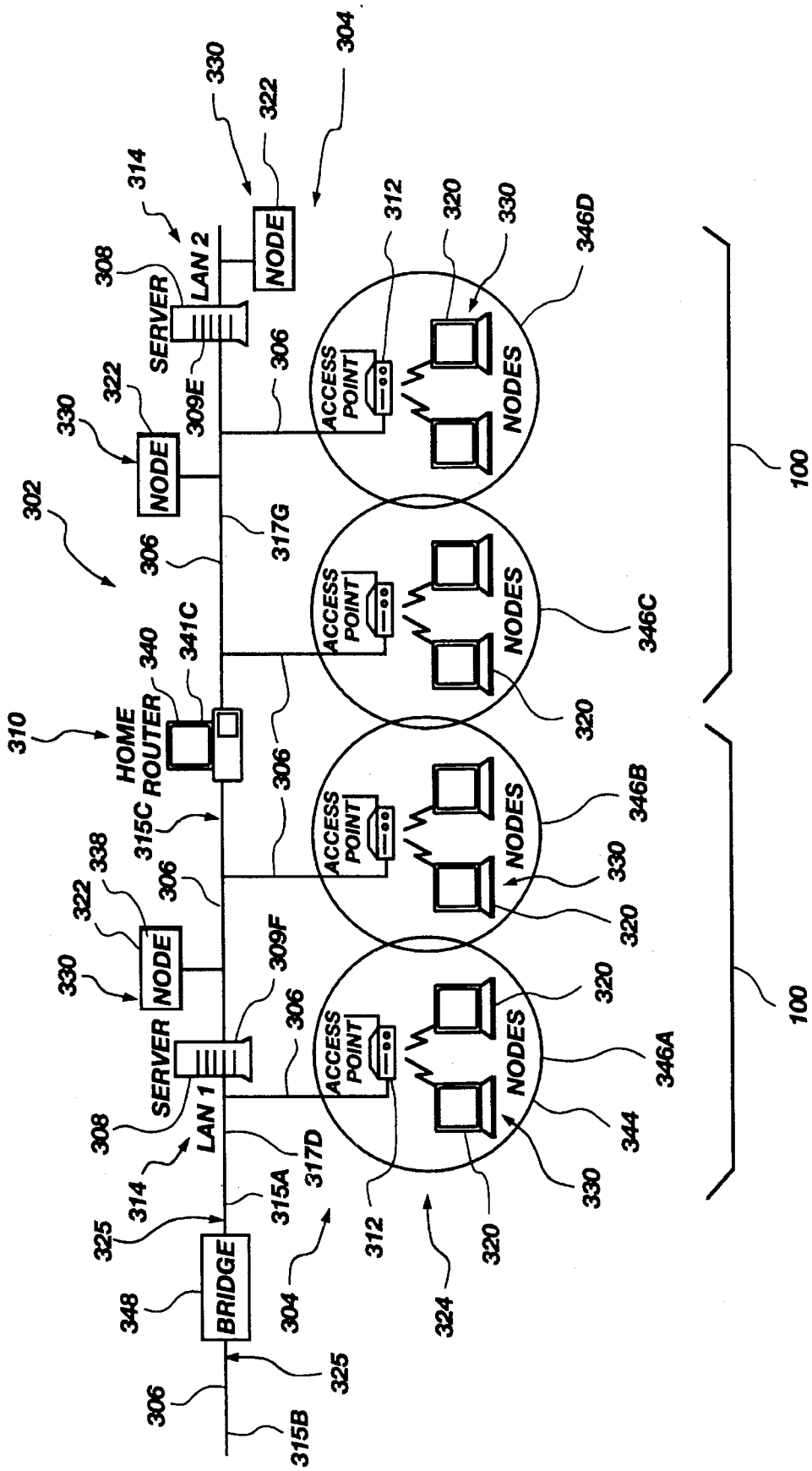
FIG. 2 is a schematic diagram of a hybrid network containing hard-wired networks and mobile links to mobile nodes.

The presently preferred embodiments of the invention will be best understood by reference to the drawings of FIGS. 1–2, wherein like parts are designated by like numerals throughout.

Figure 3:
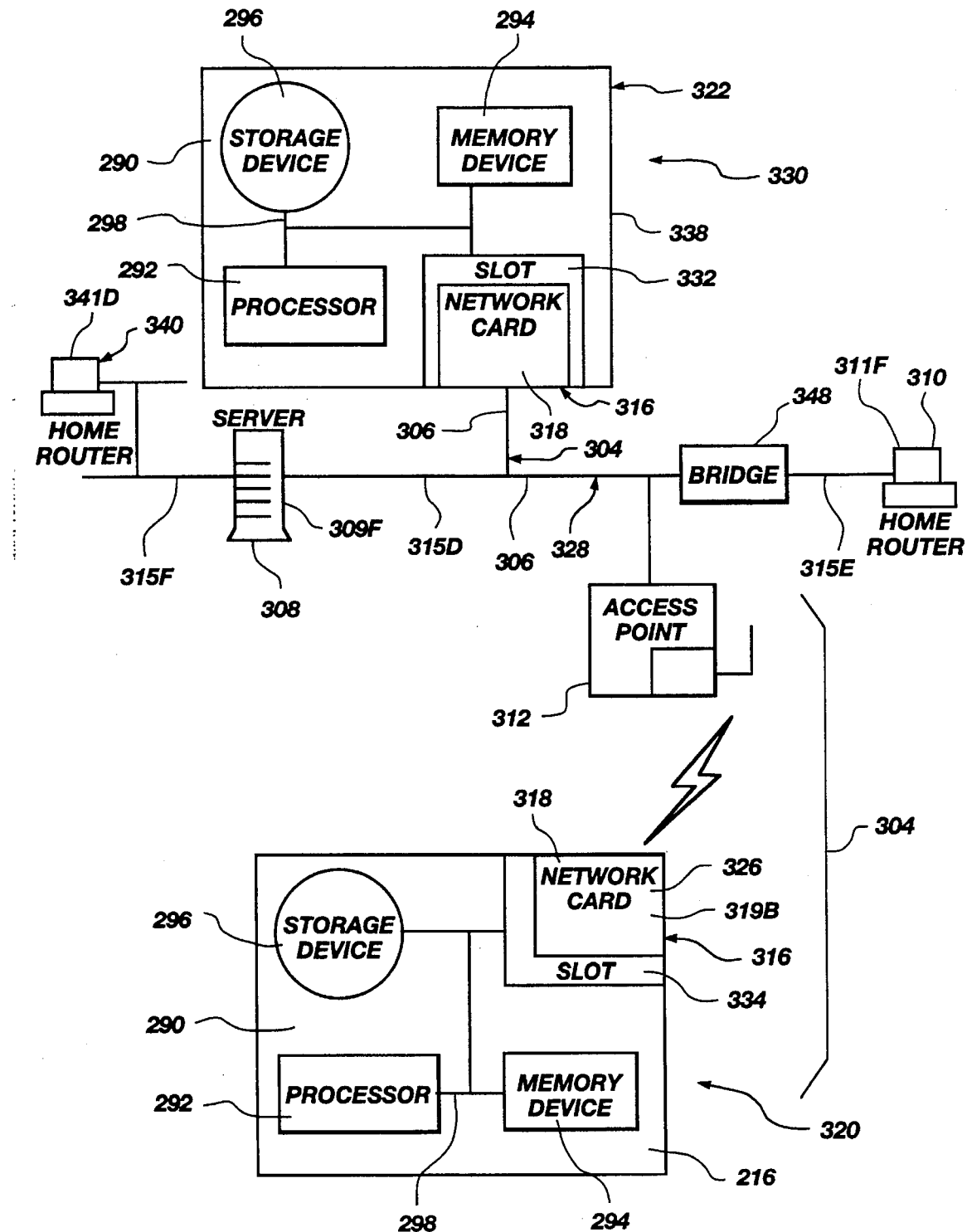
FIG. 3 is a schematic block diagram of a mobile host and a fixed host connected to a bridged local area network.

Reference is next made to FIG. 3, which illustrates in more detail one preferred embodiment of a schematic diagram derived from the block diagram of FIGS. 1–2. Those of ordinary skill in the art will, of course, appreciate that various modifications to the detailed schematic diagrams of FIGS. 1–3 may easily be made without departing from the essential characteristics of the invention, as described in connection with the block diagrams of FIGS. 4–16 above. Thus, the following description of the detailed schematic diagrams of FIG. 1–16 are intended only as examples, and simply illustrate certain presently preferred embodiments of a schematic diagram that is consistent with the foregoing description of FIGS. 1–2 and the invention as claimed herein.

From the above discussion, it will be appreciated that the present invention provides a computer 290, that may include a processor 292, memory device 294, and a storage device 296 interconnected by a bus 298. A computer 290 or a number of computers 290 may be interconnected in a network 300. In general, a processor 292 may be thought of as the logical circuit that receives and executes instructions. The processor 292 operates on data stored in and retrieved from the memory device 294 during operations. The storage device 296 typically provides permanent storage for data arranged in files as well as application programs for instructing the processor 292. The bus 298 provides a path by which the data may be transmitted and received between the processor 292, memory device 294 and storage device 296. Numerous devices constitute computers 290. For example, modem technology has provided microprocessor-based equipment of almost limitless variety, many of which devices may be connected to a network 300 as "smart" devices.

The term "network" is used for the principal of networking at many levels. Thus, a generic network 300 may be a reference to an individual local area network 314 or an internetwork 302. As discussed, an internetwork 302 may be a routed network 100 (secondary or tertiary network), while a local area network (LAN) 314 is a primary network.

Each network 300 and internetwork 302 must connect various devices through carriers 304. Carriers may be physical cables or lines 306 or wireless transmission and reception devices, such as the access point 322 and access point card 326, or wireless router 342.

A carrier structure may be thought of as a mechanism for communicating data between two devices. For example, a line or wire is one kind of suitable carrier, whether embodied in a twisted pair, coaxial cable, or fiber-optic line. These examples are "hard-wired" carriers 304, and may include transmitters and receivers at each end, as necessary, as part of the carrier 304. Similarly, an infrared beam, radio wave, visible light beam, or other electromagnetic radiation may be transmitted and received by suitable hardware devices and their communicated radiation as a wireless carrier.

A network connects over carriers 304 a server 308 to various nodes 330 or clients 330. In a network 300 or local area network 314, a server 308 may be thought of as a computer 290 running administrative software that controls access to files on the server and access to devices connected to all or part of the network 300. For example, a server 308 may control access to and use of resources such as disk drives, printers, and other peripheral devices. A computer 290 acting as a server 308 in a network 300 makes resources available to nodes 330 on the network 300. Thus, an individual user working at a work station as a node 330 on a network 300 may be able to "time share" resources with other users.

Oftentimes, a node 330 may be referred to as a client 330, using the model of a client/server relationship or architecture within a network 330. Each node 330 may be a computer 290 or other device containing a processor 292 for accomplishing some function. The function of a network 300 is to provide communication between multiple nodes 330.

Communication is desirable at the highest ISO/OSI levels. Computers 290 configured as servers 308 on a network 300 may provide transfer files and applications. To configure is to set up connections. addresses, protocols, and the like for a device or software. Examples of servers 308 include the servers 309A–E.

Routers 310 direct information between networks. A router 310 may be thought of as an intermediate device on a communications network for expediting the delivery of message packets 460. In a tertiary network linking many computers 290 through a mesh of many possible primary network connections, a router 310 both receives and forwards messages between a source and a destination. The router 310 seeks the most efficient available route for sending a message (e.g. packet 400), and may subdivide a message, sending parts of the message over one network 300 with the remainder over another. On a tertiary network 302 comprised of multiple LANs 14, a router 310 serves as a link between the LANs 14 allowing the messages to be sent from one to another. A router 310 maintains a table 367 of information binding addresses of nodes 330 to its own address to render the nodes 300 accessible through the router 310. Examples of routers include routers 311A–311D.

Some routers 310 are designated as home routers 340. A home router 340 is a router that 1) advertises over the internetwork 302 its reachability for a mobile host 320, and 2) maintains a record of the current mobility binding data 368 between the mobile host's constant address 360 and local network address 370. For example, the routers 341A–D are all home routers 340 for creating constant (virtual) addresses 360 for nodes 330 configured as mobile hosts 320 to roam over an internetwork 302 across boundaries represented by routers 310. Mobility binding is the association of a constant address 360 and a local address 370. To bind, is to associate two pieces, strings, bytes, or other identifiable units of information to one another.

A local network-level address 370 is one that a mobile host 320 obtains by querying a new network 300 to which it has roamed. The 4 byte network number 352 in this address is the network number 352 assigned to the network 300 (LAN) to which the mobile host 320 is actually attached. A local address 370 of a mobile host 320 reflects an actual location in an internetwork 302.

Home routers 340 may also create a, unique address 350 for a node 330 at one time, according to the invention. The home router 340 maintains binding data 368 to bind the virtual address 360 of a mobile host 320 to a local address 370 identifying an actual network 300 and local node number 374 at which a mobile host 320 is actually connecting to an internetwork 302. The home router 340 may also maintain binding data 368 binding multiple local addresses 370, (although only one may be active at a time) to a node 330 and a virtual address 370. Binding data 368 may include preferences or priorities of local addresses 370, for example, according to bandwidth of a network 300. Thus, a node 330 may be accessible by a home router 340 at a highest available bandwidth automatically. Thus, for example, a highly preferred local address 370 may be disconnected, the node being thereafter accessed through a less-preferred, lower-bandwidth, wireless, access point 312. A mobile host 320 may be a network end station or node 330 that supports roaming in an internetwork 302. A mobile host 320 can maintain sessions while roaming from one network 300 to another.

A constant network address 360 identifies a mobile host 320 that obtains this address at start up. It is assigned by the home router 340 and remains unchanged regardless of where the mobile host 320 is attached to the internetwork 302. Since the constant address 360 is referenced to a virtual network number 362, it is also called a virtual address 360.

Networks 300 may include lines 306 connecting to various nodes 330. However, in general, the carriers 304 may include access points 312 for connecting a node 330, also known as a host 322 or a mobile host 320 when operating according to the invention, to the line 306 of an individual network 300. Thus, an access point 312 may include a transmitter and receiver operating at some electromagnetic frequency such as infrared, radio frequency, or the like, for transmitting and receiving data with a mobile host 320. Corresponding to an access point 312 may be an access point card 326 connected to, or inserted into a slot 332 or PCMCIA slot 334 of, a mobile host 320 acting as a node 330 on a network 300. Thus, an access point 312 and access point card 326 together with the electromagnetic waves by which they interconnect may comprise a carrier 304 for the purposes of a network 300.

A local area network 314 may actually be comprised of multiple carriers 304 such as lines 306. Moreover, a local area network (LAN) 314 may be comprised of multiple segments 315A–F. Segments 315A–F may be separated by a bridge 348. A bridge 348 is a device that connects networks 300 of the same type, allowing equipment on one LAN 314 to communicate with devices on another LAN 314.

A device programmed to act as a server 308 may also act as a bridge 348 connecting various segments 315A–F of a network 300. Again, a server 308 may be thought of as a computer 290 having a processor 292 and memory device 294, of which some portion or portions are allocated to hosting network server software. Thus, a server 308 may be thought of as a computer 290 programmed to act as the server 308, but also may be thought of as the computer 290 itself. Thus, a computer 290 acting as a server 308 may also act as a bridge 348 by being programmed with bridge software.

Each node 330 connects to a carrier 304 (such as a line 306) by a network card 316. The network card 316 is typically connected to the bus 298 in the computer 290 of the node 330. By using a network card 316, a node 330 may connect to a specific LAN 314 such as one of the LANs 317A–E.

One popular type of network card 316 is of a class of devices called PCMCIA cards 318. A PCMCIA card is one of a host of interface cards manufactured according to a PCMCIA standard. Thus, the PCMCIA card 319A of FIG. 3 happens to be a network card 316 serving the mobile host 320 by connecting it to the local network 328 by way of an access point 312. That is, the network card 316 for the mobile host 320 in FIG. 3 is a PCMCIA card 318, and that PCMCIA card 318 is a specialized access point card 326 capable of wireless communication with the access point 312. By contrast, the network card 318 in the slot 332 of the fixed host 338 may be just a typical network card 316.

In general, the mobile host 320 and the fixed host 338 may both be regarded as hosts 322. That is, a host 322 is a computer 290 or other device containing a processor 292 capable of hosting the software and protocols according to the apparatus and methods of the invention.

The use of access points 312 permits creation of wireless networks 324. However, routers 342 may also be connected by wide area network links and the like or by other wireless links to create wireless networks 324. Thus, a completely wireless network 300 in which routers communicate wirelessly and mobile hosts 320 communicate wirelessly is contemplated. That is, routers 310 may be configured as wireless routers 342 that may communicate with one another. Similarly, routers 310 may be configured to communicate wirelessly with mobile hosts 320 through access point 312. Thus, the link between a node 330 and router 310 may be wired or wireless in network 300. Similarly, the connection between routers 310 may be wireless in network 300. Thus, network 300 may be completely wireless, completely wired, or a hybrid at virtually any carrier 304. Examples are the wireless networks 324 and the hard-wired networks 325.

A useful feature of PCMCIA cards 318 is that like all other hardware manufactured according to IEEE standard 802, each PCMCIA card 318 has a unique MAC-layer address 336 or MAC number 336. The MAC address 336 is used by devices communicating at a data-link layer in the ISO/OSI model. Network addresses 350 such as those of users on the Internet, are typically administered by a central registry.

Similarly, MAC addresses 336 are administered by a central registry. However, whereas most computer addresses 350 are associated with a user or a location, a MAC address 336 is associated with a specific hardware device. A method and apparatus in accordance with the invention may take advantage of the existence of a MAC address 336 for each PCMCIA card 318 configured as a network card 316 in a mobile host 320.

Roaming creates difficulties in addressing, because addresses 350 tend to be specific to networks 300 for which the addresses 350 were created and routers 310 serving those networks 300. That is, a router 310 deals only with networks 300. Each router 310 maintains a table 367 of binding data 368 identifying what networks in an internetwork 302 may be reached by any specific router 310. Thus, packets 400 of data 404 are typically passed by means of headers 398.

Figure 4:
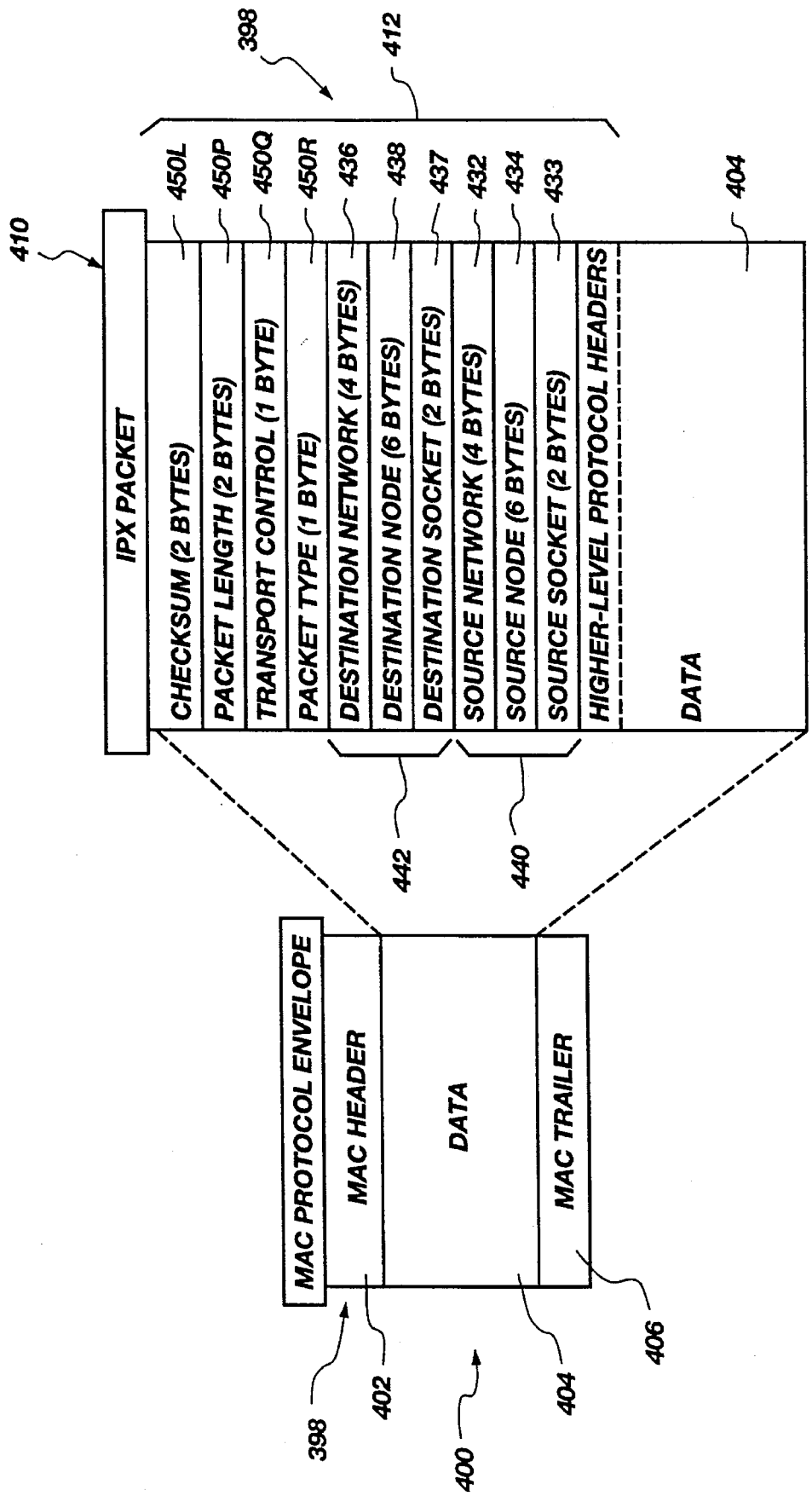
FIG. 4 is a schematic block diagram illustrating the packet structure for the internetwork of FIG. 1.

For example, in FIG. 4 a MAC header 402 followed by substantive data 404 and a MAC trailer 406 may comprise a single packet 400. A packet 400 may also be referred to as an envelope 400. Note that multiple headers may be put in packets 400 by each node 330 or router 310 that handles a packet 400. For example, the internetwork packet exchange (Novell's™IPX) packet 410 may add its own IPX header 412, which is, nevertheless, a header 398 similar to the MAC header 402 in purpose. That is, a header 398, in general, directs, or contains information to direct, a packet 400 to a destination.

Similarly, a header 398 also contains data identifying the source of a packet 400. Thus, a conversation between nodes 330 within an internetwork 302 may be conducted with a minimum of data traffic. Each device (router 310, node 330, etc.) in an internetwork 302 may change the header 398 on any given packet 400 passing through. Although the IPX (internetwork packet exchange protocol) example is used here, in general, the packet 400 is a network packet. However, the IPX packet 410 of FIG. 4 is configured as an IPX packet suitable for use in a method and apparatus according to the invention.

When a mobile host 320 roams across a router boundary (e.g. router 310), the address 350 of the mobile host 320 could become a problem for a conventional network 300 or internetwork 302, as discussed above. In the example of FIG. 2, the home router 341C happens to be a router 310 configured to act as a home router 340 according to the invention. The home router 341C has access to the network 317D and the network 317E. Each mobile host 320 exists in a cell 344. That is, an access point 312 may communicate by a wireless carrier 304 with a mobile host 320 within some geographical range. Overland, a cell 344 may exist for some distance. However, within a building, manufacturing plant, operating area, city, agency, or the like, a cell 344 may be restricted by some other bounding mechanism. For example, a wall or floor may create a shielding of one access point 312 from a mobile host 320 placed a mere 10 feet away on a lower floor. Thus, a mobile host 320 may operate with a single access point 312 within a cell 344.

When a mobile host 320 moves between, for example, a cell 346A and a cell 346B, on the same network 317D, the same network server 308, in this case, the server 309D, may still address the mobile host 320. However, a mobile host 320 moving from the cell 346A or 346B to a cell 346C or 346D has crossed a router boundary as defined by the home router 341C. That is, any router 310 positioned as the router 341C would constitute a router boundary between networks 300, in this case the networks 317D and 317E.

A router 310 deals only with networks 300. Each individual network 300 provides addressing for the nodes 330 in the respective network 300. Thus, "migrating" or roaming from a cell 346B to a cell 346C may cause confusion as to the address 350 of a mobile host 320 for the network 317E as well as the router 341C, depending upon the protocol used.

In a method and apparatus according to the invention, the home router 340 may be configured to provide addressing and reachability for a mobile host 320 that migrates across a router boundary. A method and apparatus in accordance with the invention operates to provide a permanent or constant address 360 for each mobile node 320. The process begins when a node 330 logs-on to a network 300 through any server 308. The node 330, if it is a mobile node 320, requests a home router 340. The message requesting a home router 340 is forwarded through whatever router 310 might be connected to the network 300 accessed by the mobile host 320 to eventually be received by a home router 340.

The nearest home router 340 responds to the message from the mobile node 320. The home router 340 may be very distant or very close in terms of the number of hops between the mobile host 320 and the home router 340. The number of hops is the number of networks 300 or routers 310 over which a message must be transmitted between a sender and a receiver.

Upon receiving a connection from a network server 308, a mobile host 320 asks for the network number 352 to which the mobile host 320 has connected. The router 310 that responds may identify to the mobile host 320 the network number 352.

Referring to FIGS. 1–16 and particularly FIGS. 4–10, the mobile host 320 can read its own MAC address 336 from the network card 316, typically a PCMCIA card 318 for a mobile host 320. That is, the mobile host 320, for example, may operate with the IPX protocol and software for reading the MAC address 336 from an access point card 326 in the mobile host 320. If a node 330 is not mobile, it can likewise access the MAC address 336 associated with a network card 316 by which it connects to a network 300. Thus, the mobile host 320 has both a network number 352 and a unique MAC address 336 that can then be used as a node number 354 on the network 300 identified by the network number 352.

The mobile host 320 exchanges information with the first home router 340 to respond to the mobile host 320. The mobile host 320 may provide a local address 370 comprising a local network number 372 and a local node number 374. The local network number 372 corresponds to the network number 352 that may be obtained from the router 310 that first responded to the mobile host 320, from a server 308, or from a home router 340. In one embodiment, a mobile host 320 may simply obtain a network number 352 from the nearest router 310 on a network 300. In another embodiment, the mobile host 320 may obtain a network number 352 from the home router 340 that first responds.

Thus, by one mechanism or another, a mobile host 320 may obtain local network number 372 which is valid so long as the mobile host 320 remains physically in communication with the network 300. For example, a mobile host operating in cell 346D may log-on to the network 317E through the access point 312 accessing the home router 341C. (see FIG. 2)

During logging-in, a home router 340 assigns to the mobile host 320 a virtual network number 362. In addition, the home router 340 assigns a virtual node number 364. The virtual network number 362 and the virtual node number 364 are also known as the constant network number 362 and constant node number 364, respectively. Together the virtual network number 362 and virtual node number 364 are included in a virtual address 360 by which any device will contact the mobile host 320 for the entire session until the mobile host 320 has logged-off.

After obtaining a virtual (constant) address 360 from the home router 340, a mobile host 320 has two addresses 350 known by the home router 340.

The home router 340 binds the virtual address 360 to the local address 370. Thereafter, the header 398 on any packet 400 (message) directed to the mobile host 320, upon arriving at the home router 340, is reconfigured so that the packet 400 (for example, the IPX header 412) is re-addressed by the home router 340 to the local address 370.

For example, any packet 400 containing an IPX packet 410 would contain an IPX header 412. Thus, in the IPX header 412, the destination address 442 would be the virtual address 360 for all packets 400 directed to the mobile host 320. Similarly, all packets 400 outbound from the mobile host 320, and containing an IPX packet 410, would likewise contain an IPX header 412 having a source address 440. That source address 440 for outbound packets 400 would be the virtual address 360 of the mobile host 320. Incidentally, the address 350 in a system operating under the IPX protocol, may contain a socket 433, 437 identifying applications and other users above the ISO/OSI network level that will use the data 404 in the packet 400.

Thus, the home router 340 may re-address all packets 400 going to a mobile host 320. In each case, a packet 400 between the home router 340 and the mobile host 320 will bear the local address 370. The local address 370 is a real address 350 and includes a real local network number 372 and a real local node number 374. As a practical matter, the local node number 374 may be a number assigned by a server 308, a router 310, or may be otherwise assigned.

Incidentally, all networks 300, regardless of the network software or protocol under which they operate, may contain network numbers 352, node numbers 354, and the like. However, an apparatus and method in accordance with the invention include both a virtual address 360 and a local address 370, one constant and virtual, the other temporary but real, respectively. The concept of multiple addresses may be implemented in multiple protocols. However, the IPX protocol available in Novell™ networking systems has been found to be a suitable example for practicing the invention.

Moreover, an apparatus and method according to the invention may provide multiple local addresses 370. For example, a hard-wired PCMCIA card 318, acting as a network card 316, and a PCMCIA type wireless card 326 may exist in a single mobile host 320. The home router 340, or mobile host 320 may be programmed to select which device will provide the default connection to a network 300, and which will provide a backup. For graceful degradation, such as to a lower, wireless bandwidth when a hard-wired network card 316 is unplugged, all access point card 326 may be a backup. Thus, roaming may be user transparent, with a mobile host 320 being plugged in, unplugged, moved, and plugged in elsewhere during a continuous session.

A home router maintains a table 367 containing the virtual address 360 and the local address 370 within the binding data 368 of the table 367. Thus, when the home router 340 communicates with any router 310 anywhere else in an internetwork 302, the home router 340 may advertise its "reachability" or "accessibility" to the mobile host 320. Thus, any node 330 anywhere within an internetwork 302, desiring to correspond with the mobile host 320 will address all packets 400 to the virtual address 360 of the mobile node 320. The home router 340 advertises only the virtual address 360 for the mobile host 320. Only the home router 340 need know (contain binding data 368 for) the relationship between the local addresses 370 and the virtual address 360 of the mobile host 320. Thus, any packet addressed to a node's virtual address 360 will go to the home router 340 for forwarding to the current local address 370.

A home router 340 receiving an incoming packet 400 addressed to the virtual address 360 may strip off the destination address 442 from a header 412, 398 of the packet 400 and replace the destination address 442 with the local address 370. The original destination address 442 was only a virtual address 360 for which no actual network exists.

In the foregoing example, a mobile host 320 may be the specific mobile host 321A of FIG. 1. A node 330 with which the mobile host 321A is corresponding may be the correspondent host 390. A correspondent host 390 is a node 330, typically remote from the mobile host 320 with which the mobile host 320 is communicating. The correspondent host 390 may be either mobile or non-mobile. Likewise, in general any node 330 may be a host 323 or correspondent host 390 as these terms are simply used with reference to a particular communication activity.

The home router 340 that is the closest to the mobile host 321A would be the specific home router 341A. Thus, in the preceding example, the mobile host 321A may have a local address 370 corresponding to the network number 352 of the network 317E. (see FIG. 1) If, the mobile host 321A next migrates to a position such as that occupied by the mobile host 321B, the virtual address 360 of the mobile host 321A does not change. Nevertheless, the mobile host 321A would repeat the process of determining its own local address 370 by communication through the access point 313A through which the mobile host 321B is communicating with the network 317D. The mobile client 321A would have no need to log-in upon arrival at the cell 344 serviced by the access point 313A. Instead, the mobile host 321A would obtain the local address 370 by combining the network number 352 corresponding to the network 317D with the specific IEEE-assigned MAC address 376 associated with the access point card 326 (e.g. a PCMCIA card 318 associated with the mobile host 321A), by which the mobile host 321A communicates with the access point 321A.

The mobile host 321A reports back to the original home router 341A, to which the mobile host 321A originally logged-in, the new local address 370. The home router 341A then updates the binding data in the data tables 367 to reflect the association of the virtual address 360 and the new local address 370 on the network 317D.

Figure 5:
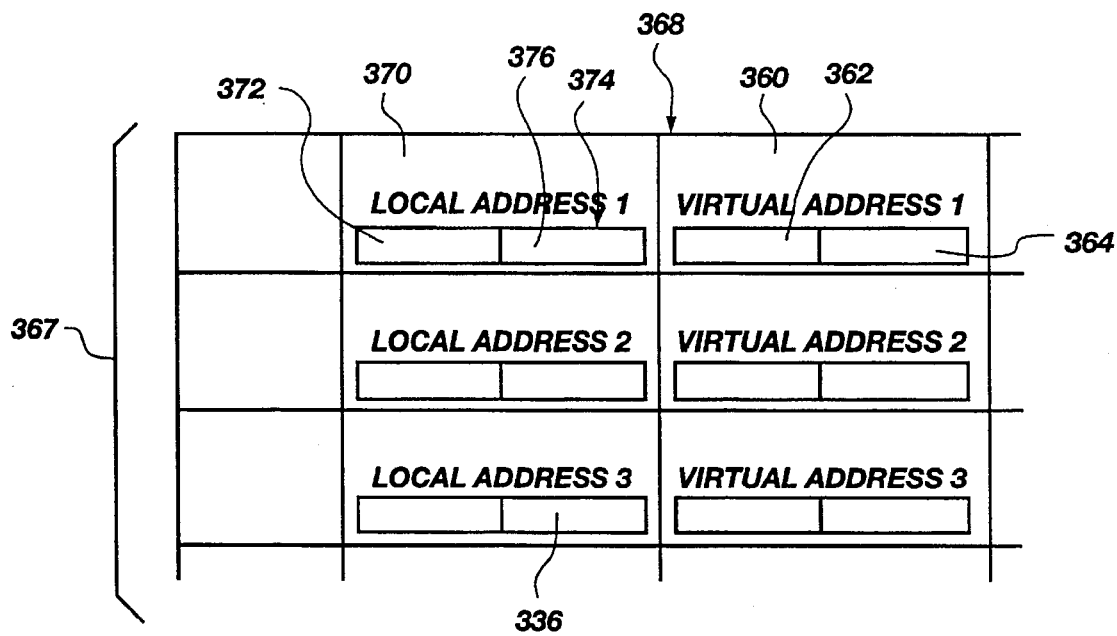
FIG. 5 is a schematic block of a table containing binding data for a home router.
Figure 6:
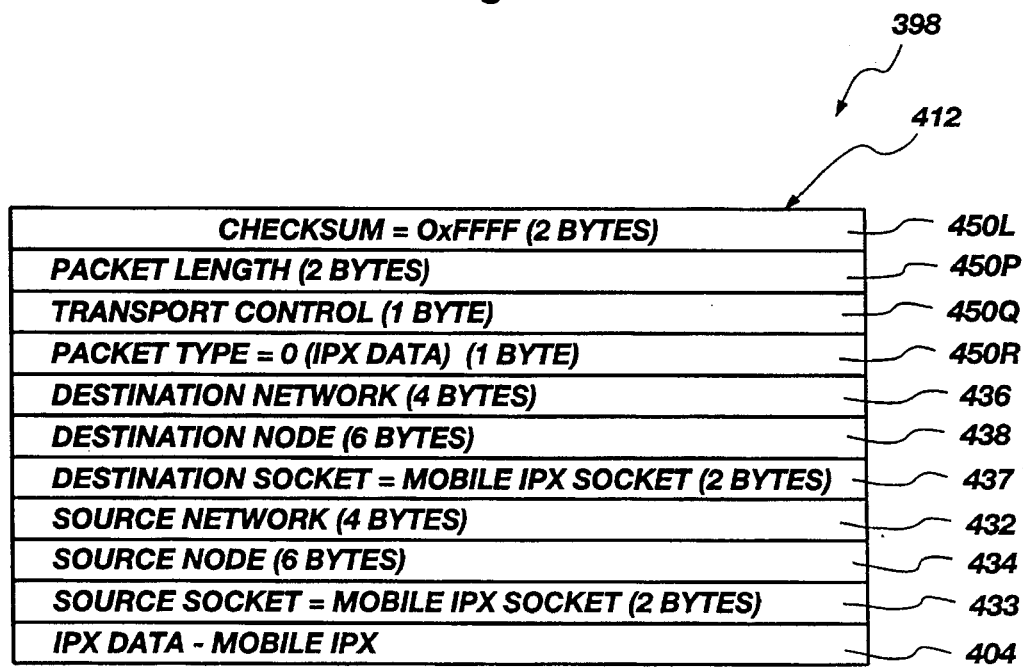
FIG. 6 is a schematic block diagram of a header for a digital data packet.
Figure 7:
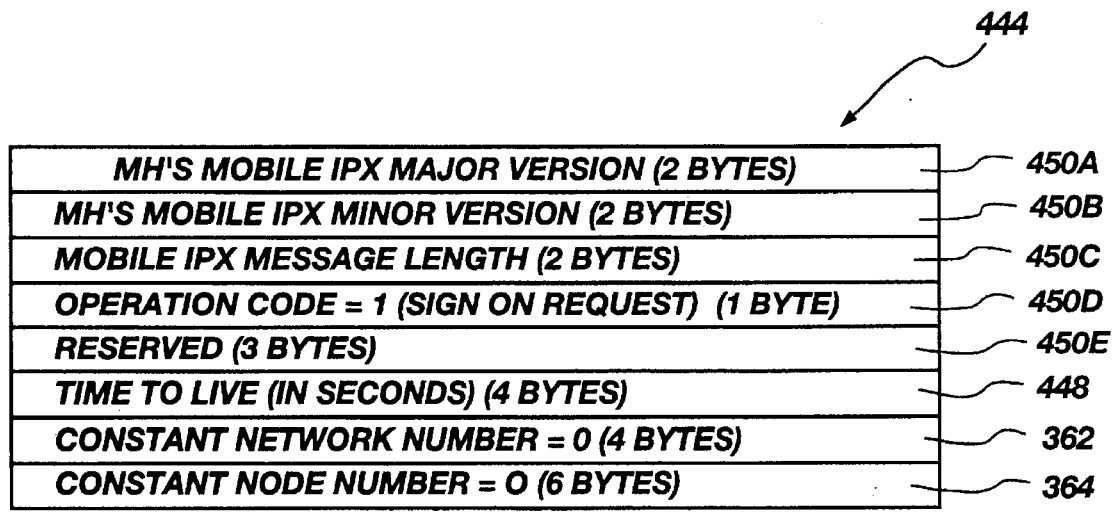
FIG. 7 is a schematic block diagram of a header for a sign-on request packet.
Figure 8:
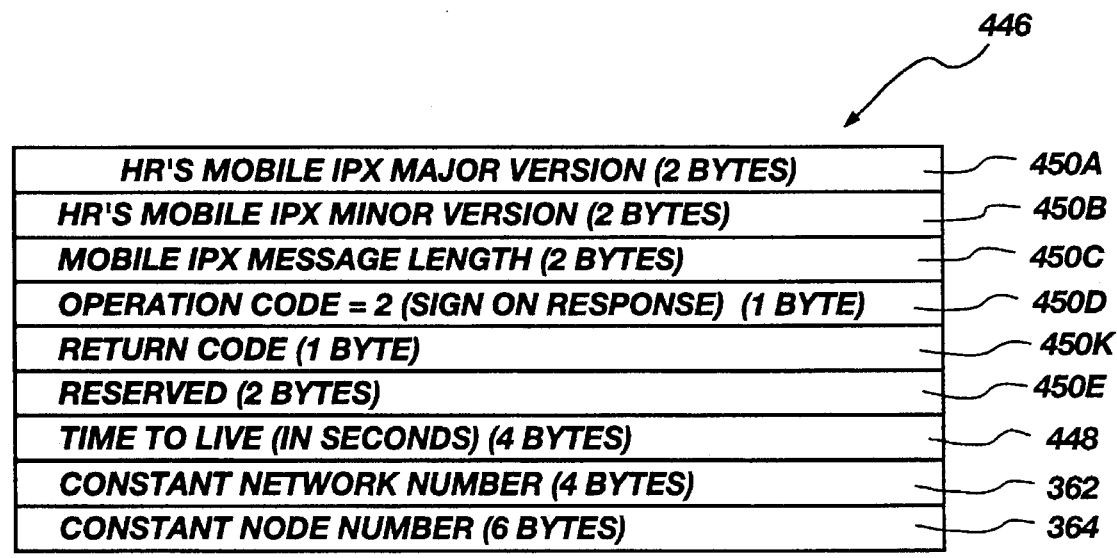
FIG. 8 is a schematic block diagram of a header for a sign-on response packet.

An example of a table 367 of binding data 368 is illustrated schematically in FIG. 5. Multiple tables 367 having a variety of binding information relating to an entire internetwork 302 may be stored on a storage device 296, or memory device 294 within a computer 290 hosting software, all of which comprise a router 310. In particular, the binding data 368 relating virtual addresses 360 to local addresses 370 may be unique to a home router 340. Thereafter all packets 400 from the mobile host 321A have their headers 398 (in our particular example, IPX header 412) re-written to reflect the addresses 350 as discussed above. Thus, incoming packets 400 are addressed to the mobile host 321A through the access point 313A on the network 317D. Outgoing packets from the mobile host 321A are directed from the network 317D to the corresponding host 390 of the example.

In the event, that a home router 340 does not exist on a particular network 300 to which a mobile host 320 happens to roam, connections are not sacrificed. No special, specific requirements need be imposed on network 300 to support roaming mobile hosts 320. The only requirement is that the network 300 at issue be operating under the stone network protocol (IPX in our example) as that of the mobile host 320. The networks 300 do not need to operate under the mobile protocol of the mobile host 320.

Moreover, a mobile host 320 merely seeks the nearest home router 340 when logging-in to the internetwork 302. Therefore, no home router 340 need be within a specific network 300. Several advantages accrue to tiffs architecture. One advantage is that networks 300 supporting correspondent hosts 390 need not have home router software, home routers 340, or foreign agents or other general delivery mechanisms to forward packets 400 to a mobile host 320. Perhaps as importantly, or more so, a mobile host 320 may log-on to a home router 340 many hops away. In fact, a home router 340 for a California user may exist in California. When the California user travels to New York, the California user could conceivably log-on again to the home router 340 located in California, if that home router 340 is the closest home router 340. Thus, the prior art difficulties of the existence and compatibility of support systems for nodes 330 roaming about an internetwork 302 are obviated by a method and apparatus in accordance with the invention.

EXAMPLE

A network 300 typically includes a line 16 (e.g. twisted pair, coaxial, fiber-optic cables) interconnecting all the nodes 10 at a hardware level (OSI physical layer). Prior art networks 300 do not allow "mobile hosts" 320 (e.g. a computer, workstation, device, etc.) to interoperate easily or conveniently with other mobile 320 or fixed hosts 338. A user must typically log off and then log on every time the physical connection is broken between a node 330 and a network 300. Even in the most advanced networks, an address 350 is limited to the network 300 to which the node 330 is physically connected. A node 330 may not have two addresses at once. Addresses are sometimes user-specific.

Referring to FIGS. 4–17, a mobile host 320 may have a virtual address 360 and one or more local addresses 370. One local address 370 is operational at a time. However, several local addresses 370 may be simultaneously bound (through not simultaneously communicable), representing multiple, simultaneous, actual, physical connections between a mobile host 320 and a network 300. During a session, the virtual address 360 never needs to change. By contrast, a mobile host 320 may roam across many different networks 300 in an internetwork 302, acquiring a new, different local address 370 (e.g. promptly readdressing with each card swap) in each network 300.

The home router assigns by a virtual network number 362 and a virtual node number 364. In one preferred embodiment, the home router 340 provides an arbitrary number in sequence as a virtual node number 364. However, a MAC-layer address 376 provided for each network card 316 under the IEEE standard 802 may be used as one portion of a virtual address 360 that also includes a virtual network number 362. That is a home router 340 could potentially use the node number 374 used in a local address 370. The constant node number 364 could be the same as the local node number 374, although not preferred.

A node 330 in general, or a mobile host 320 in particular, may be a notebook or other portable computer 290. Both portable and extremely powerful, computers 290 are no longer constrained by weight and size to operate in only a single, fixed location. At the same time, large internetworks 302, containing numerous nodes 330 and networks 300 are becoming indispensable to more and more computer users. The ability to access information and communicate globally is limited still by the complexity of access. An ability to attach a node 330 (e.g. computer 290) to a network 300, located wherever a user happens to be working, is highly desirable. Moreover, a user needs to maintain as nearly the same level of service received at a desk top node 330, such as one having a hard-wired, connection to a LAN 314, as possible.

The emergence of wireless networks 324 underscores the need for ease of migration. A user may move from one router 310, for example, a wireless router 342 servicing a cell 344 of a wireless network 324, very rapidly. In prior art networks 300, a user may spend more time logging on and off of adjoining wireless networks 324 than operating the mobile host 320.

By contrast, in an apparatus and method according to the invention, movement (migration) of a mobile host 320 from one network 300 to another across an internetwork 302 is achieved transparently, with little or no direct involvement by a user in the process.

A PCMCIA card 318 is a credit-card-sized adapter card as portable as the ubiquitous floppy disk. A user can switch the PCMCIA card 318 insertable into the PCMCIA slot 334 of a computer 290 of a mobile host 320 without re-booting the computer 290.

The Personal Computer Memory Card International Association (PCMCIA) comprises a group of manufacturers and sellers of computer hardware. The association promotes standards for cards to be interfaced with personal computers 290. For example, computers 290 of all sizes may have a variety of devices that may connect as peripheral equipment. Thus, devices may be configured according to the PCMCIA standard to be universally accepted by computers 290 having PCMCIA slots 334. An individual computer 290 or other device may have a device driver for operating the PCMCIA card 318 provided by a user. Meanwhile, the PCMCIA card 318 fitting into the PCMCIA slot 334 supported by the driver, may include memory devices, processors 292, interfaces, and the like for performing desired functions for the host computer 290.

Two types of networks 300 can be formed with wireless connectivity. The first uses access points 312. An access point 312 is a MAC (Media Access Control, sue IEEE 802 standard) layer bridge connecting (at the ISO/OSI physical and data-link layers) a wireless network 324 with a hard-wired network 325. The network 300 may be part of a larger internetwork 302 such as Internet. The second type, an ad hoc network, does not have access points 312 and is local to a small group of users that interact on a peer-to-peer basis. This type of network 300 does not contain a central point of control. For example, in one current system, a wireless LAN may provide communication up to a radio frequency at 2.4 GHz. At this frequency, the coverage of one cell 344 may be approximately 40 to 50 meters radius indoors. PCMCIA cards 318 may operate to provide wireless connection of a mobile host 320 at a radio frequency providing high bandwidth, which in one current example may be up to 1 Mb of bandwidth. Since bandwidth relates directly to the speed of transfer of data 404, a transparent method and apparatus are required in order to proliferate the use of portable, wireless, user-friendly, mobile host 320 in the workplace.

The MAC layer, actually a sub-layer, differs from one IEEE 802 standard to another, but deals primarily with network 300 access and the detection of collisions between packets 400. Together with a logical link control (LLC) sub-layer, the MAC sub-layer is part of the data-link layer in the ISO/OSI model for network 300 levels. Thus, the MAC layer or sub-layer is just above the physical (hardware) layer.

Referring now to FIGS. 4–16, addresses 350 are composed (in an IPX example) of a 4 byte network number 352 and a 6 byte node number 354. The node number 354 is selected to be the MAC-layer address 336 (generally) or 376 (specifically for a PCMCIA card) of the network adapter card 316 in a node 330. Since almost all electronic devices used today have IEEE-assigned, globally unique, MAC addresses 336, the node number 354 may thus be made unique.

The network number 352 identifies the network 300 to which the node 330 is attached. In the prior art, an implicit assumption is typically made that the location of a node 330 on a network 300 remains fixed. A router 310 can only route packets 400 based on network numbers 352. Therefore, if a node 330 moves from one network 300 to another, packets 400 destined for that node 330 will no longer reach it correctly. The node 330 has to use the network number 352 belonging to the new network 300 in order for routers 310 to continue to deliver packets 400. However, many protocols and applications obtain a node address 350 at the start of a connection (session) and "remember" or save the address 350 during the life of the connection. Therefore, even if a node 330 were to pick up a new local address 370 every time it roamed, the applications roaming would be confused. Thus, users have to restart applications every time a node 330 or mobile host 320 roams to a new network 300. This requirement will quickly become unacceptable to users as workplace mobility of users increases.

Most wireless media provide two forms of wireless connectivity. A group of mobile hosts 320 are able to form an ad-hoc network 300 and perform peer to peer communication. If mobile hosts 320 are to be connected to an existing internetwork 302, access points 312 in a network 300 allow mobile hosts 320 to communicate with services in the internetwork 302. An access point 312 can be thought of as a MAC-layer bridge between a network 300 such as an individual LAN segment 315A, 315B, 315C and a wireless cell 344 range. All access point card 326 such as a PCMCIA card 318, designed to wirelessly communicate with an access point 312 may be connected to a node 330 to make the node 330 a mobile host 320.

Within an individual LAN segment (e.g. segment 315A, 315B, 315C) all access points 312, on a LAN segment 315A-C, can coordinate among themselves to transparently hand off mobile hosts 320 from one cell (345C, 345D) range to another. As soon as a mobile host 320 crosses a router 310 boundary, access points 312 can no longer help the mobile host 320 maintain sessions. The network number 352, and thus the network address 350, have changed from network 300 to another. Home routers 340 therefore make sure that packets 400 are delivered to the mobile host 320 on the new LAN segment 315A, 315B, 315C.

Assuming that a mobile host 320 is going to roam, it needs to obtain two network addresses 350. The constant address 360 remains unchanged until the mobile host 320 restarts. This constant address 360 allows the mobile host 320 to maintain sessions as it roams. By contrast, the local address 370 changes as the mobile host 320 roams from one network 300 to another. This local address 370 reflects the actual location of the mobile host 320 in the internetwork 302. A home router 340 advertises a new Service Access Protocol (SAP) type—home mobile agent (O×021D). SAP is used to support network services such as IPX service access. SAP information is propagated to all routers 310, just like routing information. Without modification, existing routers 310 may have SAP entries for data 404 relating to home routers 340. A node 330 can query any router 310 and receive SAP information about home routers 340. A home router 340 supports all unique virtual network number 362 for a mobile host 320. Every mobile host 320 logs on with a home router 340 and obtains a constant address 360 from the home router 340. The virtual address 360 corresponds to a virtual network number 362. A mobile host 320 may use its constant address 360 to initiate sessions with a correspondent host 390.

Conventional routing protocols may direct delivery of packets 400 addressed to the virtual address 360 to the home router 340, because the home router 340 advertises to the internetwork 302 of "reachability" to the mobile 320 host's virtual network number 352. The home router 340 will then deliver the packet to the local address 370 of the mobile host 320.

For example, in one embodiment, a computer 290 configured to be a router 310 and network server 308 may have all internal network. The internal network may be used as the virtual network 362 to support mobile hosts 320. Alternatively, a virtual network may be created. In either case, the virtual network 362 does not exist. Rather, a home router 340 keeps tables 367 of binding data 368 associated with the handling of routing requests.

Referring to FIGS. 6–17, mobile packets 420 may be located in the IPX data portion 404 following an IPX header 412 (in a header 398). The mobile host 320 first obtains a local address 370 and finds the closest home router 340. A mobile host 320 broadcasts to all nodes 330 on a LAN 314, a Service Advertising Protocol (SAP), request, "Get Nearest Server," specifying a SAP type of "Home Mobile Agent." Depending on the topology of the particular network 300 and internetwork 302 in which the LAN 314 is connected, the mobile host 320 might receive multiple SAP "Get Nearest Server" responses from routers 310 (e.g. multiple home routers 340). By network topology is meant the physical arrangement of nodes 330 and interconnecting communication links in networks 300 based on application requirements and geographical distribution of the users. For example, some standard patterns include star networks, ring networks, tree networks, mesh networks, multi-drop networks, daisy chains, and so forth. In reality, most networks 300 are made up of some combination of these topologies. Thus, the topology may be regarded as the physical layout of a computer network 300, including the interconnection of devices and communication channels into a network configuration.

Information in the first SAP response to be received will be used. The closest home router 340 can be one or more hops away from the mobile, host 320. A hop count is the number of routers 310 that a packet 400 must pass. A hop count is often limited to restrict the number of routers 310 (hops) that a packet 400 can pass before it is discarded. The mobile host 320 can find out the local network number 372 of the local LAN 314 from the source network number 432 in the header 412. A mobile host 320 now has a local address 370 made up of the local network number 372 and the 6-byte node number 374 (address), which is its IEEE-assigned, device-specific. MAC address 336.

The SAP response, immediately following the header 412, gives the mobile host 320 the address 350 of the closest Home router 340. By home router 340 is meant any router 49 programmed to work with mobile hosts 320 by providing virtual addresses 360 and forwarding packets 400 to and from a mobile host 320.

The mobile hosts 320 also obtain a virtual (constant) address 360 from the home router 340. A new, fixed IPX socket may be used in the header 412 to support Mobile IPX. The Mobile IPX socket is 0x9088. A socket number 433, 437 is a two byte hexadecimal number that identifies the ultimate destination of a packet 400 within a node 330 or, specifically, a mobile host 320. The destination socket 437 is actually a process, such as a routing or an advertising process. The process operates within a node 330 (e.g. mobile host 320). Because several processes are typically operating at any given time, socket numbers 433, 437 provide a type of "mail slot" by which each process can identify itself to the network 300. Thus, packets 400 intended for individual processes operating within a node 330 (e.g. mobile host 320) may be separately identified and communicated. A process that must communicate over the network 300 requests that a socket number be assigned to it. Any packets 400 that are addressed to a specific destination socket 437 are passed on to that process. Socket numbers provide a quick method of routing packets 400 within a node 330. Socket numbers between 0x4000 and 0x7fff in hexadecimal digits are dynamic sockets. Dynamic sockets are used by work stations to communicate with the servers 308 and other network devices. Socket numbers between 0x8000 and 0x984 ffff are "well known" sockets. These are assigned to specific processes. Sockets are administered by Novell™ for all users of NetWare™ applications.

Individual developers reserve sockets for their applications. Since it is contemplated that all mobile hosts 320 will operate under the IPX protocols, the mobile IPX may use sockets provided by IPX.

A mobile host 320 needs to obtain its constant address 360 from a home router 340. The source address 440 in the header 398 of a sign-on request 444 by the mobile host 320 is set to the local address 370 mobile host 320. The sign-on request 444 is sent to the closest home router 340 as determined from the "Get Nearest Server" request.

The mobile host 320 sends a "sign-on request" 444 or sign on request packet 444 over the network 300. The constant network number 362 and node number 364 are both set to 0 serving as a request for creation of a virtual network number 362 supported by the home router 340 and a unique node number 364 in the virtual network.

The time to live value 448 tells the home router 340 how long to keep the mobility binding data 368 (information) for the mobile host 320. If the time 448 expires and the mobile host 320 has not signed on again, then the home router 340 will delete the binding data 368 for the mobile host 320. If the mobile host 320 goes into low power, sleep mode often, then the time to live value 448 may be set to a large value. The time to live value 448 is a configurable option on the mobile host 320. The user of the system, according to his or her working pattern may set the time to live value 448 accordingly.

If the closest home router 340 is up and functional, it may send a "sign-on response" 446 to the mobile host 320. A sign-on response 446 may include major 450A and minor 450B version numbers, a message length 450C, operation code 450D, return code 450E, time to live 448, constant network number 362, and constant node number 364.

The constant network number 362 is set to a virtual network number 362 supported by the home router 340. The home router 340 sets the constant node number 364 with an available node number in the virtual network 362. As a practical matter, constant node number 364 may be the MAC-layer number 336 assigned to the network card 316 (e.g. PCMCIA card 318) of a mobile host 320 but may be any arbitrary number assigned.

If the time to live value 448 is set to a relatively long time, a home router 340 maintains the binding data 368 even though the mobile host 320 is no longer connected anywhere in the internetwork 302. This would create difficulty for network administrators monitoring mobile users' activity in the internetwork 302. A network administrator will have the option to override time to live values 448 proposed by mobile hosts 320 through their sign-ons and binding updates. If the time to live override option is enabled on a home router 340, the time to live value 448 in the sign-on response 446 and binding acknowledgements 466 has the smaller of the two time to live values 448. The mobile host 320 must honor the time to live value 448 in the response 446.

If the constant node number 364 has no relationship to the MAC address 336, then the user can switch between different media and the constant address 360 can stay the same. Only the binding data 368 between the constant 29 and local address 370 will change. As a result, sessions can be kept alive even if the user switches media (e.g. network card 316, PCMCIA card 318). A mobile host 320 may host several PCMCIA cards 318, such as, for example, a hard-wired network card 316 and an access point card 326 simultaneously in different slots 332, 334 or multiple PCMCIA slots 334. The mobile host 320 may simply send to the home router the most preferred (highest priority) local node number 374 available at a given time. Since the mobile host 320 is free to roam at will, reporting a new local address as necessary, it may do so as convenient. For example, graceful degradation may involve a mobile host 320 being disconnected from a hard-wired default connection and immediately reporting as a roaming, mobile node 320 with a wireless node number 374 corresponding to a access point card 326 connected to the very same network 300.

Figure 9:
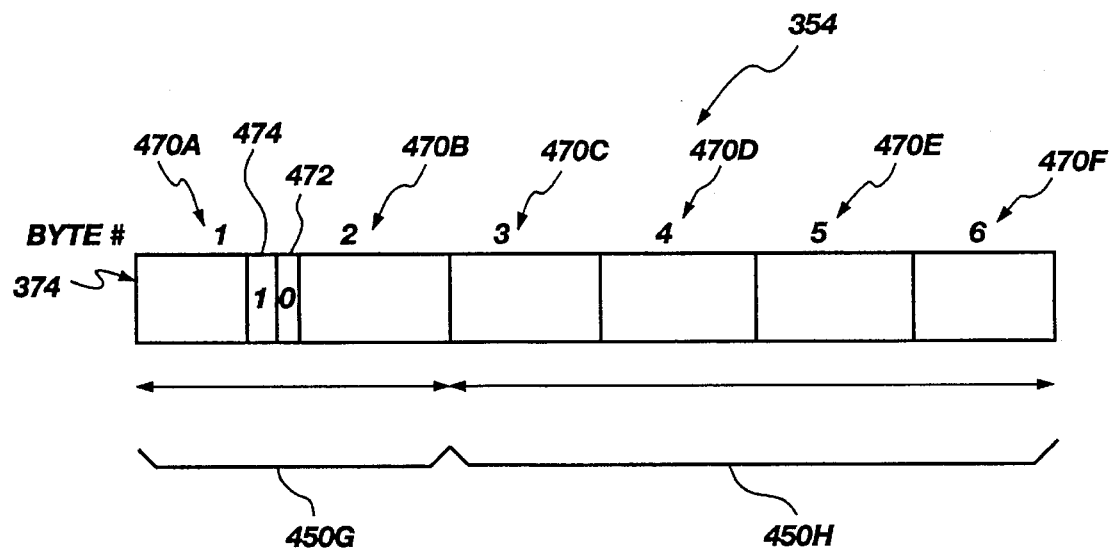
FIG. 9 is a schematic block diagram of an address for a node.

Referring to FIG. 9, a node number 354 is a 48 bit value. The least significant bit 472 of the first byte 470A, when set to 1, signifies a multicast address. Since this is a unicast type of address 354, this bit 472 is always set to 0. The second least significant bit 474 of the first byte 470A thus identifies whether an address 362 is globally or locally administered. In this case, the node number 354 is only unique within this virtual network 362 and therefore the locally administered bit will be on.

The remaining 46 bits of the node number (e.g. 374) make up a current instance number 450G of the home router 340 (2 bytes with the unicast 472 and locally administered bits set at all times), and a 4 byte counter 450H. For virtual node number 364, for example, the counter 450H starts counting from 1, i.e. the first node address 374 allocated will have the last 4 bytes set to 1. The counter increments by one every time a node address 7 is allocated. The counter moves forward as node number 374 are allocated and is not decremented even if a node 330 is deallocated. If all allocation request is received and the 4 byte counter 450H reaches its maximum value of 0xFFFFFFFF, the counter 450H wraps around and starts at 1 again.

Referring to FIG. 9, the instance number 450G of a home router 340 is stored in permanent storage such as a hard disk. Every time a home router 340 loads or initializes, it reads the instance number 450G from permanent storage, increments by one and writes the value back to permanent storage. This incremented value 450G is the current instance number 450G of the home router 340 and will be used in assignment of node numbers 374. The first time a home router 340 loads and has no instance number 450G in permanent storage, then the instance number 450G is assumed to be 0×0200 and that value is then stored in permanent storage. The instance number 450G is necessary in a case where the home router 340 is restarted with no memory of all the node addresses 356 that it assigned previously. If the mobile hosts 320 have not yet noticed that the home router 340 has restarted, the home router 340 might potentially assign duplicate node numbers 374 if an instance number 450G is not used to distinguish between the two separate operating periods.

Figure 10:
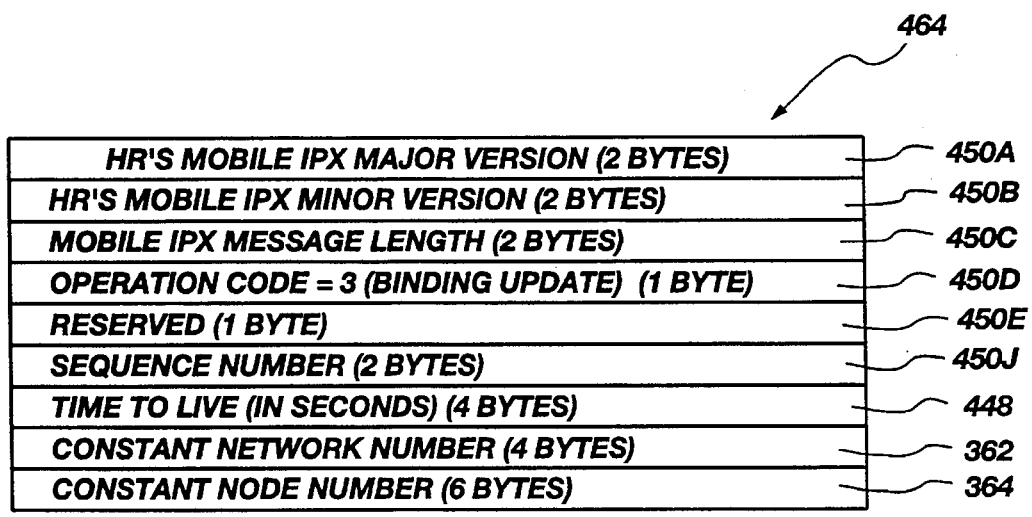
FIG. 10 is a schematic block diagram of a header for a binding update packet.

Referring to FIG. 10, every time a sign-on request 444 is received, the home router 340 checks whether the next 6-byte node number 374 (made up of the current instance number 450G and the 4 byte counter value 450H) is in use. If so, then the counter 450H is incremented and the in-use test is repeated. The search will stop when an available node number 374 is found or every single value of the 4-byte counter 450H is in use (0 is reserved) in which case an error will be returned. If the mobile host 320 receives a sign on response 446 with an error in the return code 450E, it attempts to locate another home router 340 to sign on with. The same action is performed as if the closest home router 340 is down as described below.

Figure 11:
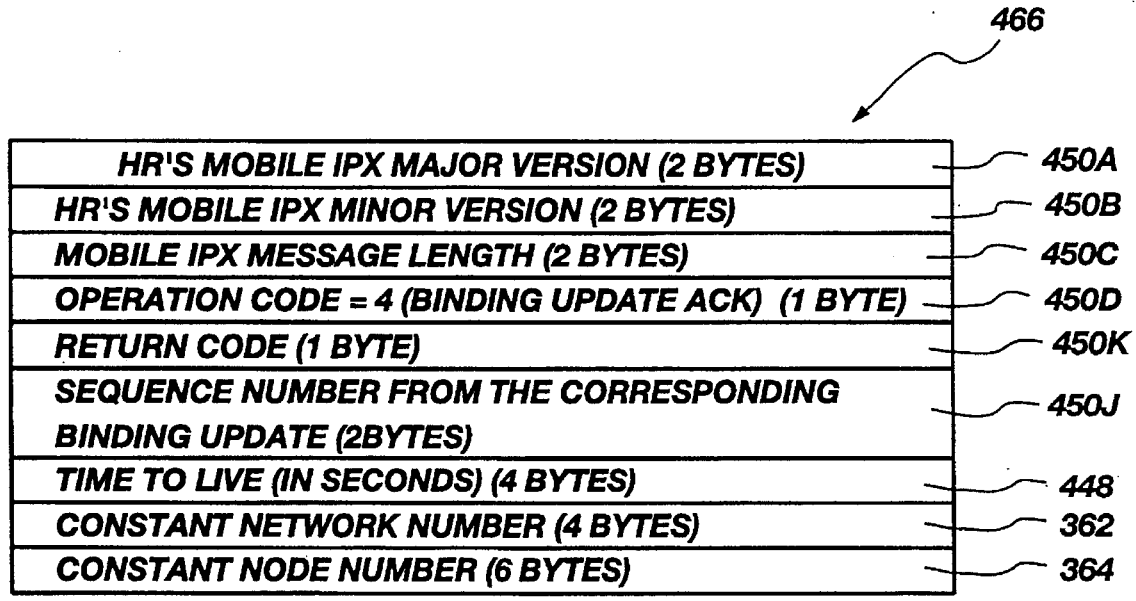
FIG. 11 is a schematic block diagram of a header for a binding update acknowledgement packet.
Figure 12:
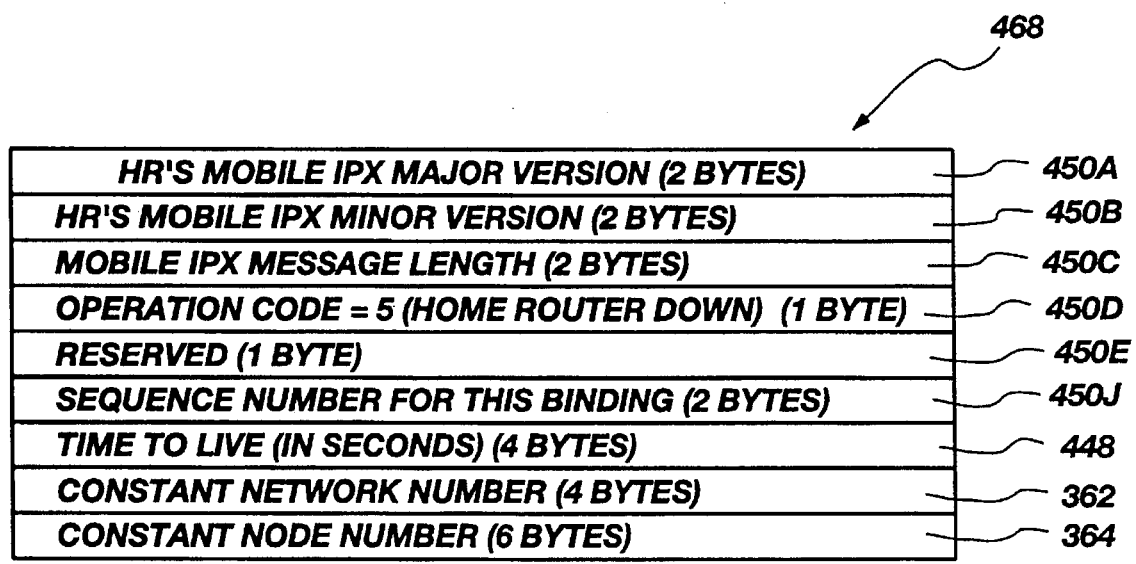
FIG. 12 is a schematic block diagram of a header for a home router down packet.

Referring to FIG. 11, once the mobile host 320 has received a sign-on response 446 from a home router 340, it has established both a constant 360 and a local address 370. Furthermore, the mobile host 320 has established a mobility binding with a home router 340. The binding data 368 identifies a mapping of the constant 360 and local 370 addresses. The sequence number 450J of this binding is 0. Subsequent binding updates to this mobility binding will have a greater sequence number 450J. The mobile host 320 call now proceed on with a regular start-up sequence, such as attaching to a File Server 308.

If, however, the closest home router 340 is down, such as when a home router 340 crashes, it may be slow in providing SAP information age out. If the mobile host 320 receives no sign-on response 446 after using its maximum number of allowed attempts, it broadcasts a SAP "Get All Services" request with a type "Home Mobile Agent." All the routers 310 on the connected LAN 314 or network 300 respond with their lists of home routers 340. The mobile host 320 selects from the list the nearest (least number of hops away) home router 340 that is NOT the crashed home router 340 with which the mobile host 320 earlier tried to communicate.

Each home router 340 keeps a database (e.g. tables 367) of binding data 368 including mobility bindings of mobile hosts 320 which signed on with it. Each mobility binding is associated with a time to live value 448 and a sequence number 450J. After a mobile host 320 signs on with a home router 340, it does not sign on with a different home router 340 until the mobile host 320 restarts. When a mobile host 320 roams into a new network 300 in an internetwork 302, an extension, called an Event Service Layer (ESL), may be appended to the NetWare™ client operation data-link interface (ODI) or similar protocol. Currently, protocols for ODI assume that the characteristics of a medium (e.g. ethernet, token ring, FDDI) remain constant after initialization (log on). The ESL allows media to communicate changes to upper ISO/OSI layers alter initialization. A media driver can register itself as a producer of events. Dynamic media, such as wireless connectors, can use ESL to communicate information about their changing environment to the higher network layers. An updated client module, such as the VLMs or the open data-link interface for the internetwork packet exchange (IPXODI), can then take advantage of the events generated by the MAC layer and react appropriately.

As a mobile host 320 roams, it moves out of the range of one access point 312 into the range of another. The MAC layer of a mobile host 320 maintains contact with access points 312. The MAC layer registers with ESL as a producer of events. As the MAC layer moves from the range of one access point 312 to another, it generates a Link Transferred Event through the ESL. IPXODI, which is registered as a consumer of events, will be notified of such an event by the ESL. The receipt of the event triggers the mobile host 320 to check if it has roamed across a router 310 boundary.

When a mobile host 320 roams from one network 300 to another, it needs to maintain its constant address 360. However, the local address 370 of the mobile 320 host must change so that packets 400 can be delivered at a new location. The mobile host 320 broadcasts a "Get Nearest Server" request for a SAP type File Server 308. The source address 440 in the response contains the local network number 372.

If the response contains the same local network number 372 as the mobile 320 host's local network number 372, the mobile host 320 did not roam across a router 310 boundary. The mobile host 320 has only moved to another access point 312 on the same network 300 having the same network number 352. No more action need be taken in this case.

Instead, if the response contains a different local network number 372, the mobile host 320 has roamed across a router 310 boundary.

The mobile host 320 keeps the same constant address 360 but obtains a new local address 370. The new local address 370 may be made up of a network number 352 of the local LAN 14 and 6-byte MAC-layer address 336 associated with the mobile host 320.

Referring to FIG. 10, the mobile host 320 may send a binding update 464 or binding update packet 464 to the home router 340 where it originally logged-on. The source address 440 in the header 412 of the binding update 464 contains the new local address 370 of the mobile host 320. The binding update 464 contains the constant address 360 of the mobile host 320, a new time to live value 448 and a sequence number 450J. In cases where a mobile host 320 switches quickly from the range of one access point 312 to that of another, two binding updates 464 might arrive at the home router 340 in an order different from that in which they were sent. A home router 340 may determine which update 464 is the "newer" one.

If the home router 340 is up and functional, a home router 340 may receive a binding update 464 with a constant network number 362 included. If the constant network number 362 is not the one that this home router 340 supports, the home router 340 sends a binding acknowledgment 466 with an error code 450K having a value of 4 to the source address 440 in the binding update packet 466. A home router 340 receives a binding update 464 with the constant network number 362 that it supports. The home router 340 uses the constant address 360 of the mobile host 320 in the binding update 464 to find the corresponding mobility binding.

If the home router 340 has no record of the mobile 320 host's constant address 360, the home router 340 may still accept the binding update 464 and service the mobile host 320. The time to live value 448 can be re-negotiated at this point. This could happen if the home router 340 had restarted. If the home router 340 finds a record of the constant address 360, the home router 340 checks the sequence number 450J in the binding update 464.

If the sequence number 450J in an incoming binding update 464 is larger than that last seen for this binding recorded by the home router 340, and the difference between the two sequence numbers 450J is no larger than some "GAP_FOR_DETECTING_WRAP_AROUND," then the home router 340 may update the binding with the new local address 370 in the source address 440 in the header 398. The time to live 448 counter for the binding is refreshed. The time to live value 448 call be re-negotiated at this time. If the home router 340 is configured with a time to live override, it compares an override value with a new value proposed by the binding update 464. The lesser value of the two will be used to restart a time to live counter for this binding. If no time to live value 448 override is set, the proposed time to live value 448 will be used to restart the time to live counter. The home router 340 then sends binding acknowledgment 466 to the mobile host 320 indicating that the binding was successful.

If the sequence number 450J in an incoming binding update 464 is smaller than or equal to the last sequence number 450J seen for the binding recorded by the home router 340, then a received binding update 464 is too old and the home router 340 will send a binding acknowledgment 466 to the mobile host 320 indicating an error. However, a smaller sequence number 450J may result from "wrap around." That is, the largest sequence number 450J possible in a 2 byte value is 65535. When the sequence number 450J reaches 65535, the next sequence number 450J in order will wrap around to 0.

At this point, the binding update sequence number 450J will seem smaller than the last seen sequence number as recorded by the home router 340. Thus, if the binding update sequence number 450J fails the above test, the home router 340 subtracts the "GAP_FOR_DETECTING_WRAP_AROUND" from both sequence numbers 450J and performs the same comparison again. If the comparison fails again, two possibilities exist. First, the mobile host 320 may have sent in an old sequence number 450J. Second, the gap between the last seen sequence number 450J and the mobile 320 host's sequence number may be too large to determine whether the difference is caused by a wrap around or a lost packets 400. Either case leads to a rejection of the binding update 464.

If the home router 340 does not respond with a binding acknowledgment 466 after expiration of a criterion (e.g. MaxTransmitTimeout), the mobile host 320 retries the binding update 464 again with the sequence number 450J incremented by one. The mobile host 320 determines that the home router 340 is down after sending a maximum number of retries of binding updates 464 and receiving no binding update acknowledgment 466 in return.

If the virtual or constant network number 362 supported by the home router 340 is down, a mobile host 320 supported by the home router 340 needs to obtain a new and different constant address 360. Applications would have to abort at this point in other networks 300 because the constant address 360 of the mobile host 320 would have to change. The mobile host 320 seeks to find a new home router 340.

Once a mobile host 320 logs on to a home router 340, to ensure that the home router 340 continues to forward packets 400 to the mobile host 320, the mobile host 320 sends to the home router 340 a binding update 464 containing the next sequence number 450J in order. The binding update 464 must arrive before the time to live 448 expires. This binding update 464 is sent even if no roaming has occurred. This binding update 464 refreshes the time to live counter of the existing binding of a mobile host 320. The time to live value 448 may be configurable through the usual configuration routine or an API such as NET.CFG in NetWare™ for IPX.

When the mobile host 320 sends out a binding update 464, the source address 440 in the header 398 of the binding update 464 contains the current local address 370 of the mobile host 320. The binding update 464 contains the constant address 360 of the mobile host and a new time to live value 448. If the home router 340 is up and functional, the home router 340, upon receipt of the binding update, uses the mobile 320 host's constant address 360 in the update to find the corresponding mobility binding. The time to live counter for the binding is refreshed and starts from the new time to live value 448 in the update.

The banding acknowledgement 466 from the home router 340 contains the mobile 320 host's constant network number 362 (the same one as that in the binding request) serving as an acknowledgment that the home router 340 has accepted the binding update 464 with the new time to live value 448.

However, if the home router 340 has crashed, no binding acknowledgement 466 returns. After re-sending the maximum allowable retries of binding updates 464, the mobile host 320 may determine that the home router 340 has crashed or been brought down. The mobile host 320 seeks to find a new home router 340 with which to sign on and obtain a new constant address 360.

Many network applications such as those operating on Novell's™ NetWare™ client systems can advertise available services through SAP. If IPX applications on mobile hosts 320 advertise themselves through SAP, several problems may result. For example, an application may use the constant address 360 as the destination of its services. However, the constant network number 362 is different from a network number 352 (e.g. such as the local network number 372) on any actual local network 300. When a router 310 receives a SAP advertisement in a packet 400 containing a source network number 432 that is different from the destination network number 436 in the header 398 (e.g. header 412), the router 310 discards the packet 400 instead of propagating the service. If the source 432 and destination network numbers 436 are different, the packet 400 needs to be forwarded. Other routers 310, such as an IPX router 310 do not forward RIP 417 or SAP 415 packets.

In a second example, an IPX router may receive information about RIP packets 417 and SAP packets 415 separately. Routers 310 may connect to several networks and thus receive packets 400 over different routes through different interfaces. When a router 310 receives instructions to a network 300 from RIP packets 415, the router 310 may record the route and the interface from which it originated. If the router 310 then receives service information from another node 330 located on the same network 300 but the RIP 417 and SAP 415 packets arrive on two different interfaces, the SAP information may be discarded. This scenario may occur when a router 310 receives packets 400 from the home router 340 through one interface while a mobile 320 host's SAP information arrives across a different interface.

Since mobile hosts 320 logically reside on a home router's 340 virtual network 362 only, direct advertisements from mobile hosts 320 from all over a sprawling, complex, internetwork 302 would confuse routers 310 as to the true topology of the internetwork 302. To solve this problem, the mobile host 320, (actually the mobile host 320 running on the IPX software) monitors each packet 400. If an application sends out SAP 415 packets, the mobile host 320 (according to IPX instructions) intercepts and redirects the packet 400 to the home router 340. The home router 340 is therefore in charge of advertising the services for the mobile host 320.

The mobile host 320 (again, the mobile host 320 running on the IPX software) may intercept SAP packets 415 received from applications running on the mobile host 320. The packet 400 received may be seen schematically in FIG. 16 (see also FIGS. 14,4).

Figure 16:
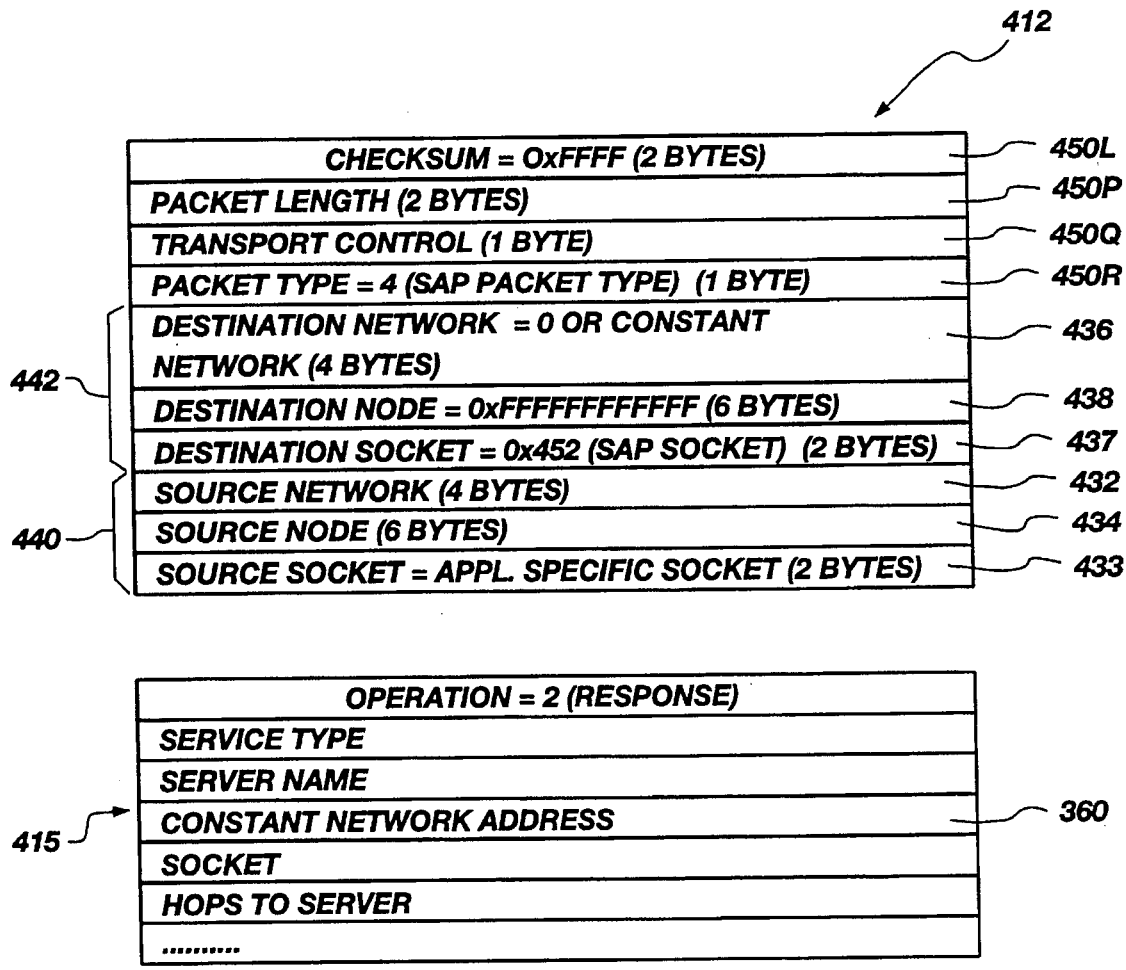
FIG. 16 is a schematic block diagram of a header for a Service Advertising Protocol packet.
Figure 17:
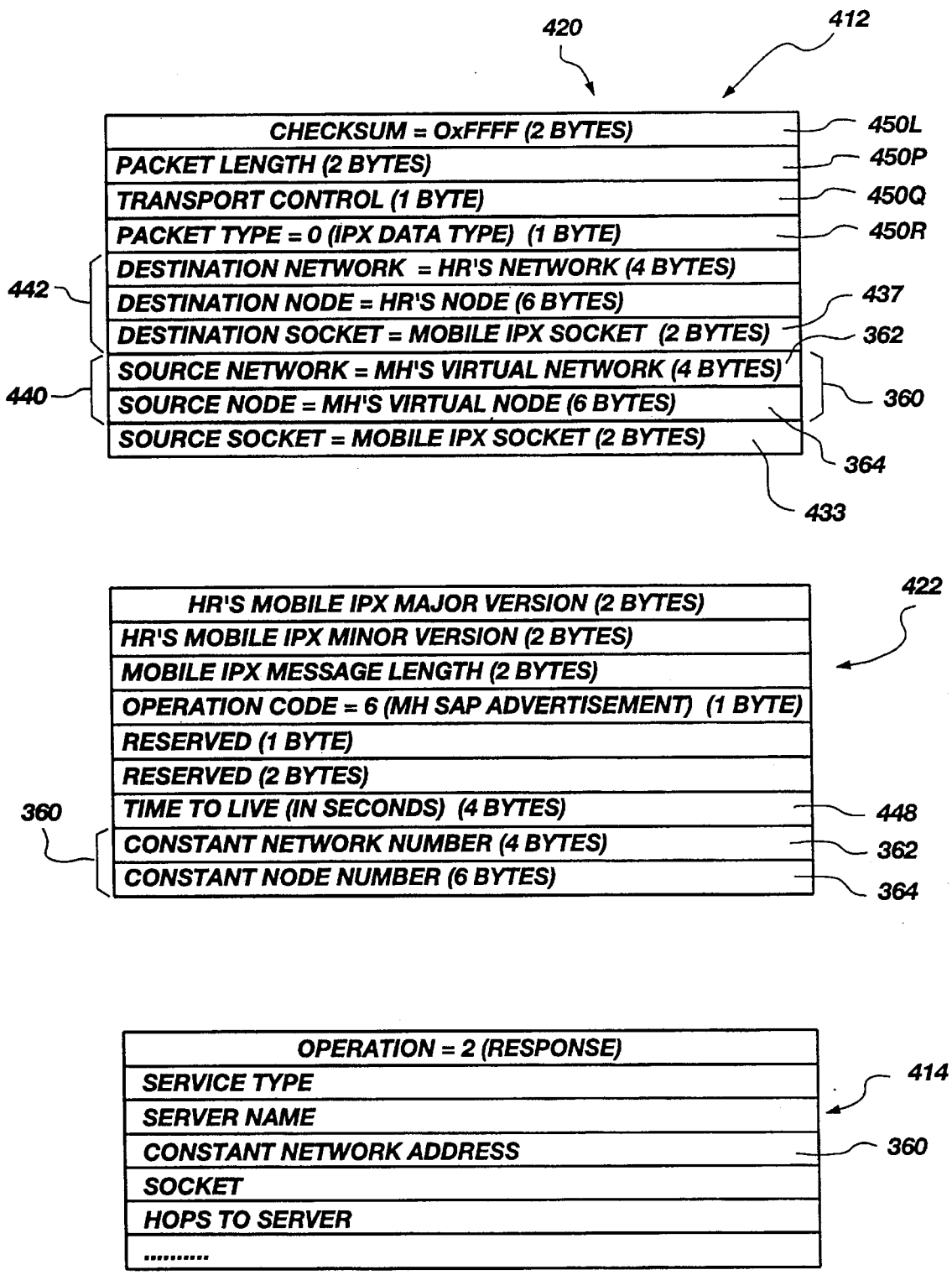
FIG. 17 is a schematic block diagram of a header for a packet for a mobile host.

Referring to FIGS. 16–17, the mobile host 320 may leave the SAP portion 414 of the header 412 as is. However, the IPX header 412 will be modified and a Mobile IPX header 422 may be inserted between the IPX header 412 and the SAP portion 414 of the header 398 for a packet 400. Such an altered packet 400, or the header 398 of a packet 400, actually may be modified as illustrated in FIG. 17.

When a home router 340 receives a SAP 415 advertisement packet from the mobile host 320, it checks to see if it has a mobility binding entry (binding data 368) for the constant address 360. If the binding exists, the home router 340 enters the SAP information into a table. If the SAP information already exists, then an aging timer is refreshed. If a binding (corresponding binding data 368) does not exist, the home router 340 drops the SAP packet 415.

If the application needs to continue to advertise its service, it may continue to send a SAP 415 packet periodically, such as every 60 seconds. The mobile host 320 redirects the packet 400 and sends it to the home router 340. The home router 340 then resets the aging timer of the SAP entry in its SAP table.

Applications exist today, operating under the IPX protocol, for example, that listen for RIP 417 and SAP 415 packets over a network 300 to acquire information. One aim of an apparatus and method according to the instant invention (for example, Mobile IPX) is to make the applications truly detect no difference between a real, physical network 300 and the constant (virtual) network 362. Applications may be confused (receive ambiguous data 404) if they detect a source address 440 of RIP 417 and SAP 415 packets different from the virtual a network number 352. The source network number 432 of RIP 417 and SAP 415 packets may be set to those of the physical network 300 to which the mobile host 320 is currently attached (e.g. local network number 372). This may occur while applications receive only the constant network number 362. The mobile host 320 needs to intercept packets 400 addressed to the RIP and SAP sockets. The mobile host 320 patches the source 72 and destination 74 network numbers with the constant network number 362 as appropriate to remove all ambiguities.

The mobile host 320 seeks a new home router 340 in certain circumstances, such as when the home router 340 crashes after a mobile host 320 has previously signed on. There are three ways for the mobile host 320 to automatically detect that its home router 340 has crashed. First, the mobile host 320 has moved and it needs to send a binding update to its home router 340. Second, a time to live 448 timer may be about to expire and needs to refresh the time to live value 448 with the home router 340. Third, a mobile 320 host's connections may not be receiving update responses 468. They may be timing out, exceeding the maximum allowable time for response.

If the home router 340 has crashed, none of the above operations can be completed. Each home router 340 supports a unique virtual network number 362 for mobile hosts 320. A mobile host 320 supported by a crashed home router 340 needs to obtain a new and different constant address 360. Applications running on the mobile host 320 will have to abort because the address 350 of the mobile "client" (mobile host 320) has changed. At this point, the mobile host 320 running the client software will make its best effort to clean up connections and look for another home router 340 with which to sign on.

A virtual loadable module (VLM) are software modules that are modular so that future network services and requirements can be added without replacing software. VLMs enable a user to customize each client (node 330), adding only those services that a user actually needs. Thus, a network administrator may maximize the use of each client's memory. VLMs are similar to loadable modules for dedicated network servers 308 in that the VLMs are loaded into the network operating system to provide additional network services. However, client VLMs may be loaded in the standard, expanded, or extended memory of a server 308 to give greater compatibility with applications. For example, a VLM may improve compatibility between DOS applications and those running under MS Windows on a network personal computer 290 (PC).

A sequenced packet exchange (SPX) is an exchange of information according to a protocol by which two nodes 330 (e.g. workstations, computers 290, other devices, or even applications) may communicate across a network 300. The sequenced packet exchange (SPX) protocol uses the network protocols used by the network 300. For example, Novell's™ NetWare™ IPX is a network protocol suitable with the mobile IPX. The SPX uses the network protocol to deliver messages (packets 400), but SPX itself guarantees delivery of the packets 400 and maintains the order of the packets on the packet stream over the network 300 or internetwork 302.

An event service layer (ESL), is sometimes referred to as a NetWare™ event service layer (NESL). The ESL operates as a protocol just above the data-link layer of the ISO/OSI model. For example, the ESL controls the interface, tier example when a user changes cells 344, cards, or networks 300. The ESL may function to provide information to routers 310 and networks 300 that a mobile host 320 has changed locations. Both VLMs and SPX may be informed by and according to the ESL of the home router 340 going down. The mobile host 320 under the VLMs and SPX will internally log-out of all connections operating under those respective protocols. That is, The network's 300 operating software operating under its protocol, for example, the NetWare™ core protocol (NCP) provides session control and packet-level error checking between nodes 330 (e.g. mobile hosts 320, routers 310, workstations. etc.). Thus, a CPU 292 in a server 308 operates according to an NCP service protocol. The operating system of a server 308 follows the network protocols (NCP) to accept and respond to service requests.

Since no connection actually exists, users will receive an immediate response when an NCP or SPX operation tails, rather than "hanging" the operating system of the mobile host 320 waiting for the time limit for retries to expire. Users can then log-in again with the desired services without having to reboot the operating system of the mobile host 320. Since this may be only a "best effort" clean up process, some applications may not be properly updated. For example, an application may not receive notification that a home router 340 is down. In those cases, a longer delay may occur before an application determines that a connection has failed. A home router 340 may be bypassed according to IPX protocol.

Major version difference are indicated by the major version number 450A in the header 412. A difference in major version 450A between software packages typically means that significant changes have occurred which make a software version incompatible with earlier versions. A mobile host 320 will receive an incompatible version error from the home router 340 if the major version number 450A of the mobile host 320 is different from that of the major version 450A of the home router 340. The mobile host 320 may notify the user that mobile support cannot be provided unless the software in the mobile host 320 is upgraded.

The minor version number 450B indicates that minor differences have occurred in the software for enabling mobility or roaming. A difference in minor version 450B means that changes have been made to the Mobile IPX (e.g. software), but backward compatibility has been maintained. Changes may typically include additions to constants, additional support functions, etc. A home router 340 may thus serve a mobile host 320 with the same major version number 450A but a different minor version number 450B. In the event of incompatible version numbers 450A, a home router 340 may send back a sign on response 446 indicating the incompatible version error and reporting its own version numbers 450A, 450B.

After a mobile host 320 successfully signs-on with a home router 340, a mobile host 320 has both a constant address 360 and a local address 370 on the immediate LAN 314 (a primary network 300). The constant address 360 of the mobile host 320 stays unchanged until the mobile host 320 restarts. The address 31 of the mobile host 320 on the immediate LAN 314 may change every time a mobile host 320 roams to a new LAN segment. (e.g. 315A, 315B, etc.)

For example, when a mobile host 320 initiates a session with a correspondent host 390, the mobile host 320 provides the source address 440 of the header 412 of the packet 400 with its own constant address 360 and the destination address 442 with all address 350 associated with the correspondent host 390. The packet 400 is delivered to the correspondent host 390 through normal routing over the internetwork 302.

The destination of packets 400 received from the correspondent host 390 are directed back to the mobile host 320 through its constant address 360. The response packets 400 are forwarded through the shortest path between the correspondent host 390 and the home router 340, because the home router 340 advertises reachability to the constant network number 362 of the mobile host 320. When the home router 340 receives a packet 400 destined for the constant (virtual) network number 362, it "looks up" in its mobility binding data 368 (e.g. table 367) the local address 370 mapped to the destination address 442 in the header 412. The home router 340 replaces the destination address 442 in the header 412 with the local address 370 of the mobile host 320. The packet 400 is then delivered to the mobile host 320 through the normal routing mechanism.

Figure 13:
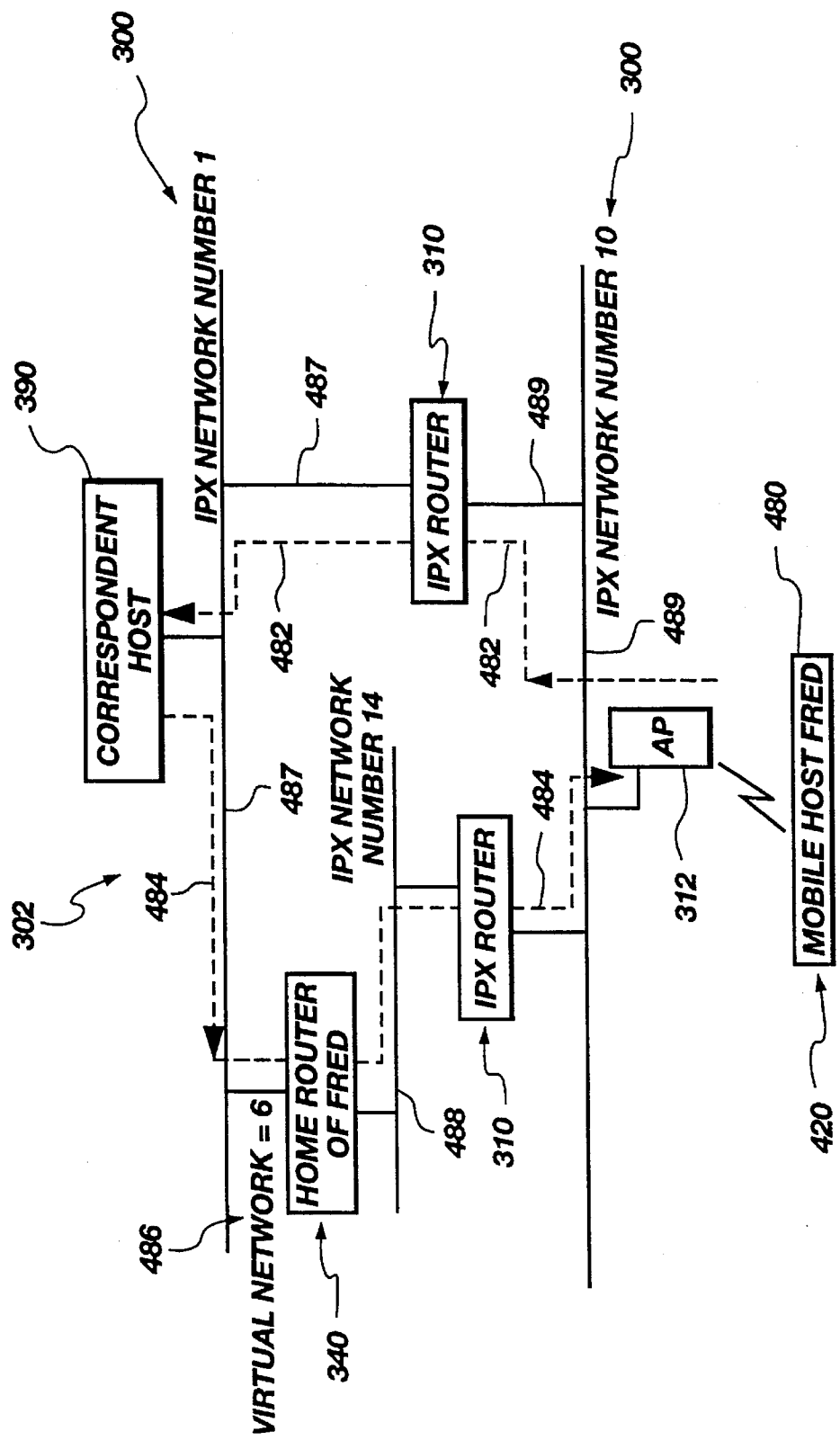
FIG. 13 is a schematic block diagram of a network according to the invention.
Figure 14:
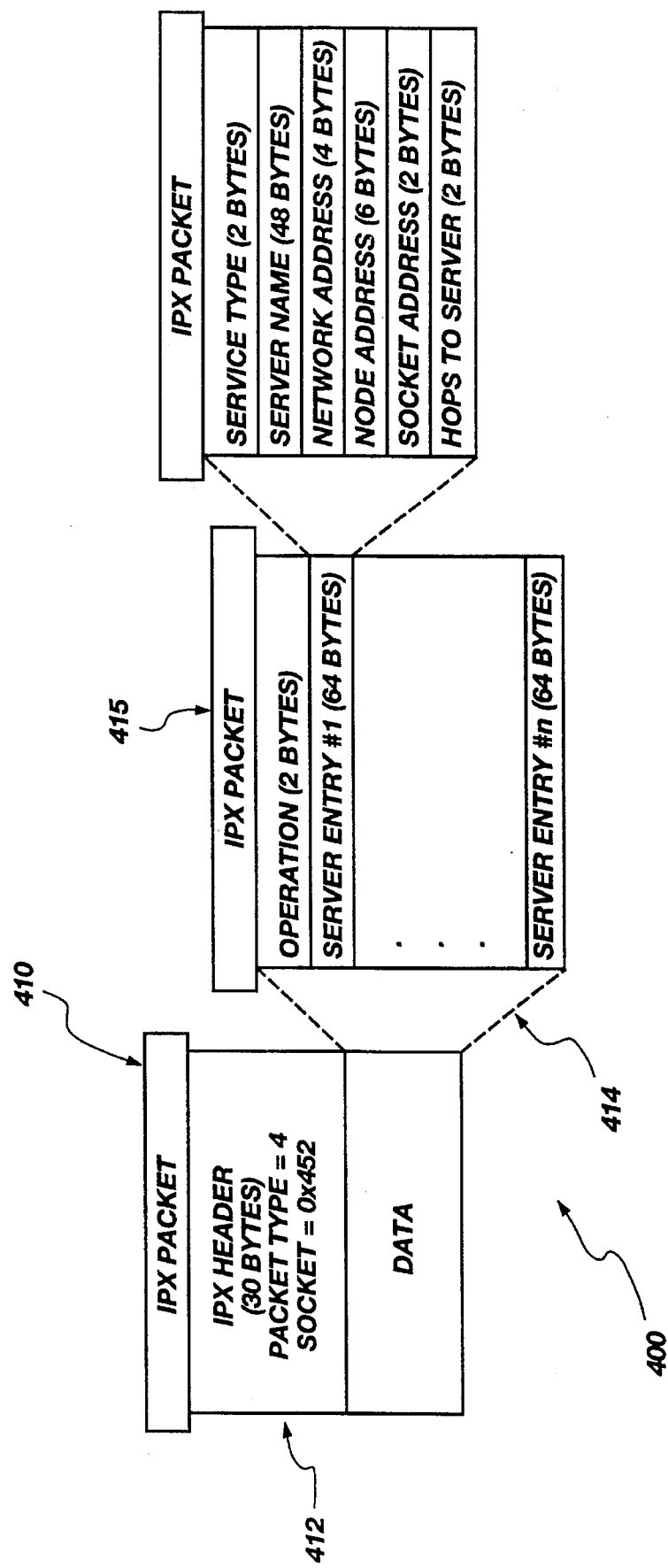
FIG. 14 is a block diagram illustrating the structure of a SAP packet.
Figure 15:
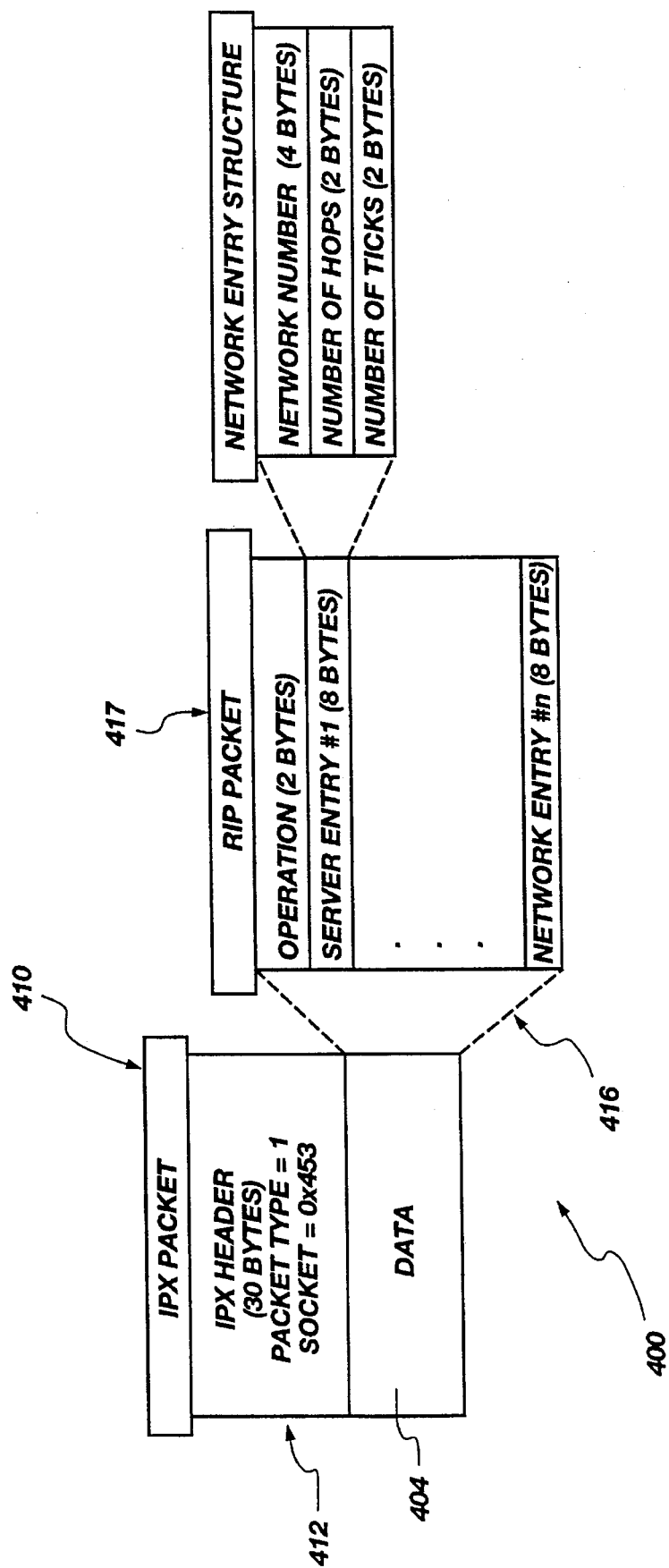
FIG. 15 is a block diagram illustrating the structure of an RIP packet.

For example, in FIG. 13 the values of the numbers, fields, or codes in the header 412 of a packet 400 passing over the route 482 include: destination network number 436=15; destination node number 4368=1 (internal network node number is always 1): source network number 432=6; and source node number 434=78. Conventional routing would cause all packets 400 to be routed through the shortest path to a destination 74.

The values of numbers in the header 412 of a packet 400 passing over the route 484 between the correspondent host and the Home router 340 include: destination network number 436=6; destination node number 4368=78; source network number 432=15; and source node number 434=1. Packets 400 over the route 484 are routed through the home router 340 because it has the shortest path to the network 486. The other networks 487, 488, and 489, form an internetwork with the network 486.

When the home router 340 receives this packet 400, the home router 340 looks up the local address 370 mapped for the constant address 360. The home router 340 substitutes the destination address 442 in the header 412. The header 412 then has a destination network number 436=10; destination node number 4368=78; source network number 432= 15; and source node number 434=1.

The packet 400 having a header 412 so arranged is delivered through the normal routing mechanism. The mobile host 320 receives the packet 400. The mobile host 320 then replaces the destination network number 436 in the header 412 with the virtual network number 352 and uploads the packet 400 to the appropriate application running on the mobile host 320. As far as applications are concerned, the address 350 of the mobile host 320 is always the constant address 360, in this case 6:78. One may notice that the packet 400 over the route 484 may take a sub-optimal path between the correspondent host 390 and the mobile host 320 because of the location of the home router 340.

If the checksum 450L is enabled in the header 412 and the home router 340 changes the destination address 442 to deliver a packet 400 to the mobile host 320, an end-to-end checksum 450L may be provided. The checksum 450L may be negotiated above the network layer if the checksum 450L will be used in a conversation. Intermediate routers 310 along a path do not typically validate a checksum 450L. After the home router 340 changes the destination address 442 of a packet 400, the checksum 450L, if enabled, will not match the content of the packet 400. However, the checksum 450L may be corrected again when the packet 400 reaches an end point application, because the destination address 442 that is changed by the home router 340 may be changed back to its original value by the mobile host 320.

As a practical matter, most users tend to use only a few the servers 308 regularly. It would be ideal to have the software for a home router 340 running on a specific the server 308 that a user accesses most frequently. If the software of the home router 340 is running on the same node 330 or system the server 308 providing the services that the user accesses most often, then sub-optimal routing is reduced or eliminated. Services on the node 330 will send packets 400 destined for the mobile 320 host's virtual network 33. The home router 340 module on the same node 330 retrieves the packets 400 before they ever arrive at the network 300 and patches the destination address 442 with the local address 370 of the mobile host 320.

If the name of a preferred home router 340 is specified when a network 300 is configured (e.g. Novell's™ for NetWare™, when running NET.CFG), then the mobile host 320 sends a SAP "Get All Server" request or an equivalent along with a SAP type corresponding to a home mobile agent. Packet 400 may contain a list of known home routers 340 on the network 300 of interest. The mobile host 320 may then scan the packet 400 for the name (identifier) for the preferred home router 340. If the preferred home router 340 is found, the mobile host 320 may then attempt to sign-on as described above.

The home router 340 may be involved in delivering every single packet 400 to a mobile host 320. In the unlikely event the home router 340 goes down, all the mobile hosts 320 it supports may have to restart to obtain new constant addresses 29. The home router 340 may present a single point of failure in a network 300. The mobile host 320, home router 340 or other device may be programmed to add replication of the mobility binding data 368. Thus, if one home router 340 crashes, another call take over. Several methods exist to prevent dependence on a single point of failure.

One solution is to make the home router 340 functionality run in a mirror server portion of an appropriate SFTIII setup for a computer 290 running Novell's™ NerWare™ and IPX. A system fault tolerance (SFT) typically involves duplicating data 404 on multiple storage devices in a system, so that if one storage device fails the data 404 is available from another device. Several levels of hardware and software exist for system fault tolerance. Each level of redundancy (duplication, backup) decreases the possibility of data 404 loss.

For example, in the case of Novell's™ NetWare™ running IPX on a computer 290, the SFTIII system fault tolerance feature continuously mirrors two servers 308, such as NetWare™ servers. If one server 308 crashes, the other will automatically provide services, beginning where the first server 308 left off. Connections will continue to operate without interruption. If the home router 340 functionality is also mirrored, then the single point of failure may be eliminated by such a secondary server 308.

From examples previously discussed, it is clear that sub-optimal routing may occur in certain topologies. Sub-Optimal routing occurs when a packet 400 takes a longer route than the shortest possible path between the source (node 434) and the destination node 438. One option is a re-direct optimization for the network protocol (e.g. NetWare™ Core Protocol NCP, in the Novell™ example) to avoid sub-optimal routing in communication. Network software such as NCP may provide for ways to negotiate options at connection start-up. A new redirect option may be added to the operating software and protocols of networks 300 so that the server 308 will accept changes of workstation address. As soon as a mobile host 320 roams to a different network 300, the mobile host 320 may send, through an authenticated channel, a new local address 370 to the server 308. The server 308 will send packets 400 directly to the mobile 320 host's local address 370, avoiding sub-optimal routing.

An apparatus and method according to the invention works well in a wide variety of cases and does not inhibit or impact future enhancements to network protocols and operating systems. To assure that operations at the application and transport levels do become aware of changes of address promptly, the apparatus and method may eliminate the prospect of a single point of failure (e.g. the home router 340), eliminate or reduce sub-optimal routing for all applications, provide improved security to protect communication over wireless media, and allow users to switch network adapter cards 316 yet preserve all connections, such as software applications and network administration, transparently to the user.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. For interconnecting devices in an internetwork comprising multiple networks, a system comprising:
    a router for receiving, transmitting, and directing data over a plurality of networks, and for providing a first signal uniquely corresponding to a network of the plurality of networks;
    a plurality of nodes associated with the network and positioned to communicate data with the router;
    a carrier structure operably positioned between the router and the plurality of nodes for transmitting and receiving data between the router and the plurality of nodes;
    a network card operably associated with a node of the plurality of nodes for transmitting and receiving data between the node and the carrier structure, and for providing to the node a second signal unique to the network card;
    the node operably connected to the router to automatically receive the first signal and the second signal and to form, in accordance with the first and second signals, a local address corresponding to the node;
    a home router programmed to automatically maintain session level connectivity between the node and the home router after the node is disconnected and reconnected to the carrier structure.

2. The system of claim 1 wherein the node further comprises a processor for providing the local address and wherein the local address comprises data corresponding to the first and second signals.

3. The system of claim 1 wherein the home router is operably connected to the internetwork to provide a third signal corresponding to a virtual network.

4. The system of claim 3 wherein the home router further comprises a home processor for providing a virtual address corresponding to the node.

5. The system of claim 4 wherein the home processor is programmed to automatically provide to the router the virtual address.

6. The home router of claim 4 wherein the home processor is programmed to create the virtual address to comprise the third signal and the second signal.

7. The system of claim 1 wherein the node further comprises a node processor programmed to provide the local address comprising the first and second signals.

8. The system of claim 1 wherein the home router comprises a memory device for automatically storing the local address and a virtual address.

9. The system of claim 8 further comprising a correspondent node operably connected to the internetwork, and wherein the home router is programmable to unbind the virtual address from incoming data received from the correspondent node addressed to the virtual address, to bind to the incoming data the local address, and to forward the incoming data to the node.

10. The system of claim 8 wherein the home router is further provided with a memory device for binding the local address to the virtual address.

11. The system of claim 1 wherein the home router including a first memory location for storing the virtual network address and a second memory location for storing the local network address simultaneously.

12. The system of claim 1 wherein the node comprises a computer connectable to the network card and wherein the network card further comprises a network connector for selectively connecting the network card to communicate with the network, and for removing the network card from communication with the network.

13. The system of claim 12 further comprising a network server operably connected to the internetwork to communicate with the node the connection status corresponding to whether the computer is connected to the network, and wherein the home router is programmed to provide a virtual response to the network server when the computer is not connected to the network, the virtual response being indistinguishable by the network server from a real response provided by the computer when the computer is connected to the network.

14. The system of claim 13 wherein the computer further comprises a node processor for running an application thereon, wherein, while the application is running, the computer is selectively, physically removable from communication with the network by a process selected from moving out of range of a wireless carrier structure, de-activation of the node processor by the application, and physical disconnection of the computer from the network, and wherein the node processor is programmed to provide an instruction to prevent crashing of the application whenever the application requires a connection of the computer to the network and the computer is removed from communication with the network.

15. The system of claim 12 wherein the computer further comprises a node processor for running an application thereon, wherein the computer is selectively removable from the network while the application is running, and wherein the node processor is programmed to provide an instruction to prevent crashing of the application whenever the application requires a connection of the computer to the network and the computer is unconnected to the network.

16. The system of claim 15 wherein the node processor is programmed to provide a suspend instruction effective to suspend operation of the application whenever the application requires a connection of the computer to the network, and the network card is not connected to the computer.

17. The system of claim 12 wherein the computer further comprises a node processor for running an application thereon, the network card is removable from the computer while the application is running, and the node processor is programmed to provide an instruction to prevent crashing of the application whenever the application requires a connection of the computer to the network and the network card is absent from the computer.

18. The system of claim 17 further comprising a second network card selectively connectable between the computer and the network, and wherein the node processor is programmed to forward a resume instruction to the application to resume operation whenever the application requires connection of the computer to the network, the second network card has replaced the network card in the computer, and the computer is connected to the network.

19. The system of claim 17 further comprising a second network card selectively connectable and removable between the computer and a second network of the multiple networks comprising the internetwork, and wherein the node processor is programmed to provide a resume instruction to effect a resumption of operation by the application when the second network card has replaced the network card in the computer, and the second network card is connected to the second network.

20. An apparatus for providing automatic addressing and roaming across an internetwork, the apparatus comprising:

a first primary network;

a router connectable to the first primary network;

at least one second primary network operably connectable at a first location to the router to extend away from the first primary network;

at least one second router connectable to a second location on the second primary network, the second location being spaced away from the first location and spaced away from the first primary network;

a third primary network operably connected to a second router of the at least one second router to be extendible away from the second router and from a second network of the at least one second primary network;

a mobile node connectable to the first primary network to transmit and receive data, and to automatically provide a local address uniquely associated with the mobile node and the first primary network; and a home router operably connected to the internetwork to provide a virtual network address uniquely corresponding to the mobile node to forward to the mobile node at the local address incoming data directed to the virtual address, and to provide continuous session level connectivity of the mobile node to the internetwork during roaming of the mobile node.

21. An apparatus for connecting a node to an internetwork, the apparatus comprising:

a network connected to an internetwork;

a node comprising a processor effective to create a local address identifying the node in the network, and for communicating the address to the internetwork;

a home router connected to the internetwork to communicate with the node, to provide a virtual address associated with the node, the node remaining continuously addressable at the virtual address during roaming by the node between the local address and a new local address, for maintaining session level connectivity of the node.

22. The apparatus of claim 21 wherein the home router comprises a processor for providing the virtual address, and wherein the virtual address corresponds to a virtual network and a virtual node number, the processor forwarding to the local address packets directed to the virtual address.

23. A method for addressing a node connected to an internetwork comprising:

connecting a node to a network in the internetwork in a session;

acquiring a network number associated with the network;

acquiring a number associated with the node;

creating a local address uniquely associated with the node in the network;

logging the node in to a home router connected to the internetwork;

providing to the home router the local address;

providing from the home router to the node a virtual address;

binding the local address to the virtual address in a memory device of the home router;

providing to another node connected to the internetwork the virtual address corresponding to the node;

forwarding to the local address packets directed to the virtual address during the session;

disconnecting the node from the network, and connecting the node to a new network in the internetwork, while maintaining session level connectivity of the node.

24. The method of claim 23 wherein connecting the node to the new network further comprises:

acquiring a new network number associated with the new network;

acquiring a new node number associated with the node;

providing to the home router the new local address;

forwarding to the new local address packets directed to the virtual address.

* * * * *

UNITED STATES PATENT AND TRADEMARK OFFICE
CERTIFICATE OF CORRECTION

PATENT NO. : 5,572,528
DATED : November 5, 1996
INVENTOR(S) : Pauline Shuen

It is certified that error appears in the above-indentified patent and that said Letters Patent is hereby corrected as shown below:

```
   In column 2, line 8, please change "arc" to  -- are --.
   In column 2, line 30, please change "all" to -- an --.
   In column 2, line 58, please change "all" to -- an --.
   In column 4, line 16, after "processors" insert -- for --.
   In column 6, line 61, please change "all" to -- an --.
   In column 9, line 27, please change "au" to -- an --.
   In column 11, line 17, after "packet", change the ":"
(punctuation colon) to -- ; -- (punctuation semicolon).
   In column 11, line 67, please change "modem" to
-- modern --.
   In column 18, line 47, after "binding data" insert "368".
   In column 18, line 58, please "from" to -- to --.
   In column 19, line 4, please change "stone" to -- same --.
   In column 19, line 46, please change "through" to
-- though --.
   In column 23, line 28, please change "0x984" to -- 0x --.
   In column 25, line 37, please change "call" to -- can --.
   In column 27, line 12, please change "call" to -- can --.
```

UNITED STATES PATENT AND TRADEMARK OFFICE
CERTIFICATE OF CORRECTION

PATENT NO. : 5,572,528
DATED : November 5, 1996
INVENTOR(S) : Pauline Shuen

It is certified that error appears in the above-indentified patent and that said Letters Patent is hereby corrected as shown below:

```
    In column 30, line 38, please change "tier" to -- for --.
    In column 30, line 56, please change "tails" to
-- fails --.
    In column 31, line 61, after "1)" insert -- ; --
(punctuation semicolon).
    In column 32, line 40, please change "the" to -- file --.
    In column 32, line 42, please change "the" to -- file --.

In column 34, line 41, please change "home router" to
-- system --.
```

Signed and Sealed this

Thirteenth Day of May, 1997

BRUCE LEHMAN

*Attest:*

*Attesting Officer*     Commissioner of Patents and Trademarks